United States Patent [19]
Perkowski

[11] Patent Number: 5,950,173
[45] Date of Patent: Sep. 7, 1999

[54] SYSTEM AND METHOD FOR DELIVERING CONSUMER PRODUCT RELATED INFORMATION TO CONSUMERS WITHIN RETAIL ENVIRONMENTS USING INTERNET-BASED INFORMATION SERVERS AND SALES AGENTS

[75] Inventor: Thomas J. Perkowski, Darien, Conn.

[73] Assignee: IPF, Inc., Darien, Conn.

[21] Appl. No.: 08/854,877

[22] Filed: May 12, 1997

Related U.S. Application Data

[63] Continuation-in-part of application No. 08/826,120, Mar. 27, 1997, which is a continuation of application No. 08/752,136, Nov. 19, 1996, which is a continuation-in-part of application No. 08/736,798, Oct. 25, 1996.

[51] Int. Cl.$^6$ .............................. G06F 17/60; G06F 17/00
[52] U.S. Cl. .............................. 705/26; 705/27; 235/375; 395/200.49; 379/93.12
[58] Field of Search .................................... 705/1, 16, 17, 705/21, 26, 27; 235/375, 376, 385, 454, 462; 395/200.31, 200.33, 200.47, 200.49; 379/93.12

[56] References Cited

U.S. PATENT DOCUMENTS 4,654,482 3/1987 DeAngelis ............................ 379/93.12
5,640,193 6/1997 Wellner ........................................ 348/7

*Primary Examiner*—Stephen R. Tkacs
*Attorney, Agent, or Firm*—Thomas J. Perkowski, Esq., P.C.

[57] ABSTRACT

A system and method are disclosed for finding and serving consumer product-related information over the Internet to consumers in retail shopping environments, as well as at home and work, and on the road. The system includes Internet information servers which store information pertaining to Universal Product Number (e.g. UPC number) preassigned to each consumer product registered with the system, along with a list of Uniform Resource Locators (URLs) that point to the location of one or more information resources on the Internet, e.g. World Wide Web-sites, which related to such registered consumer products. Upon entering the UPC number into the system using a conventional Internet browser program running on any computing platform or system, the menu of URLs associated with the entered UPC number is automatically displayed for user selection. The displayed menus of URLs are categorically arranged according to specific types of product information such as, for example: product specifications and operation manuals; product wholesalers and retailers; product advertisements and promotions; product endorsements; product updates and reviews; product warranty/servicing; related or complementary products; product incentives including rebates, discounts and/or coupons; manufacturer's annual report and 10K information; electronic stock purchase; etc. Web-based techniques are disclosed for collecting the UPC/URL information from manufacturers and transmitting the same to the Internet-based databases of the system.

7 Claims, 16 Drawing Sheets

"VIRTUAL SALESMAN™" KIOSK

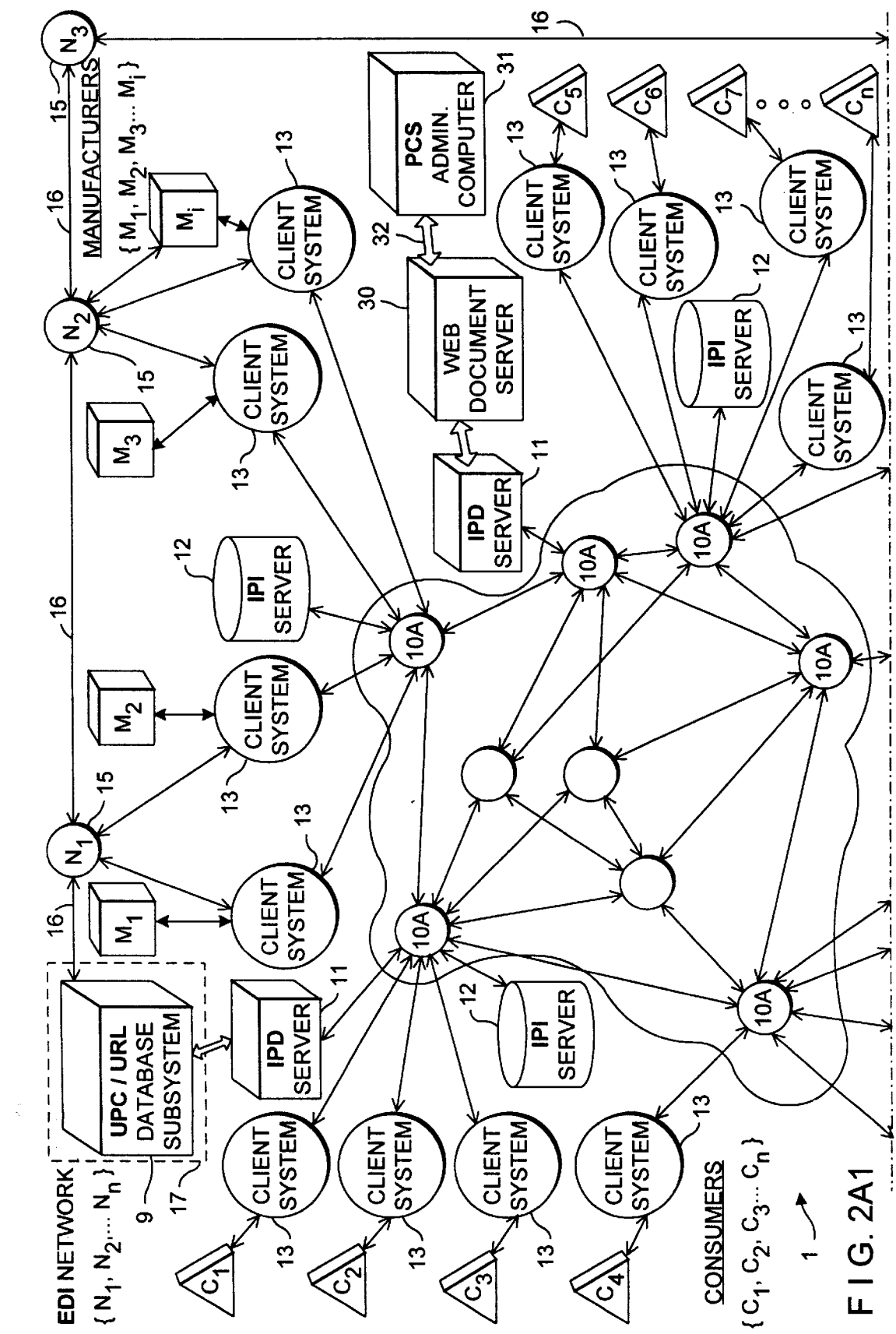
FIG. 2A1

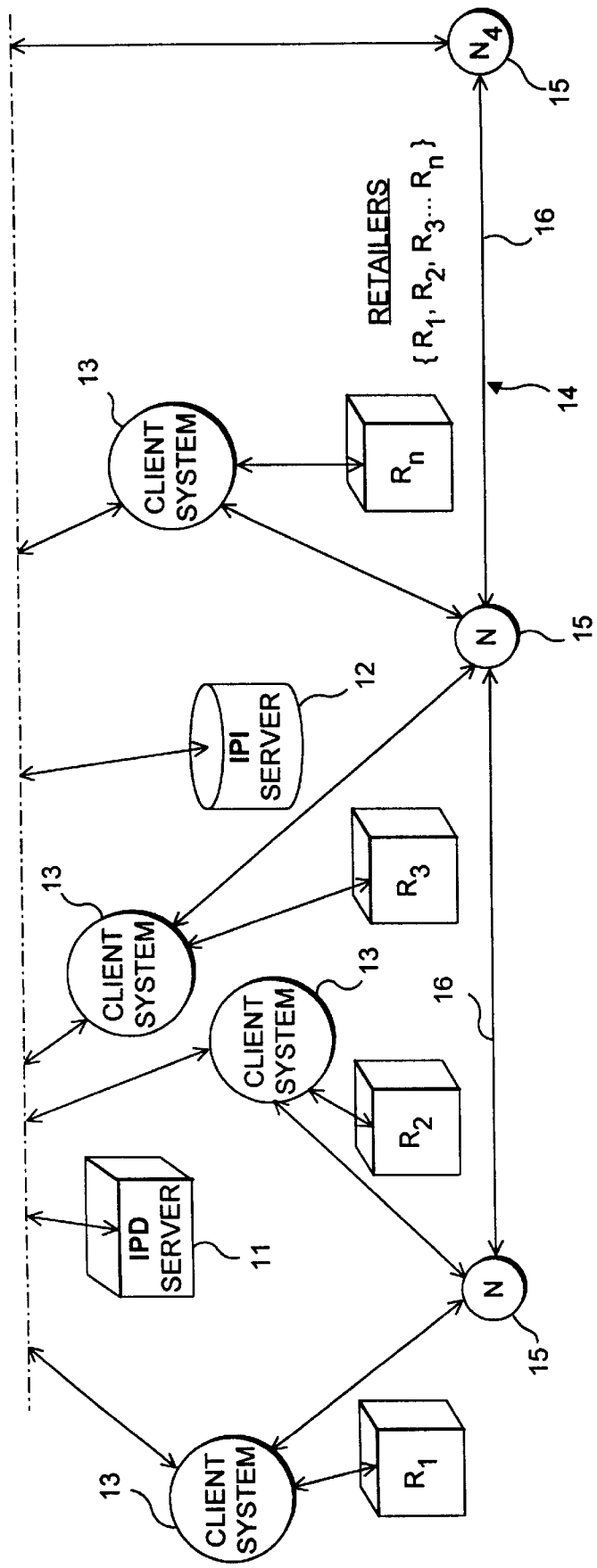
FIG. 2A2

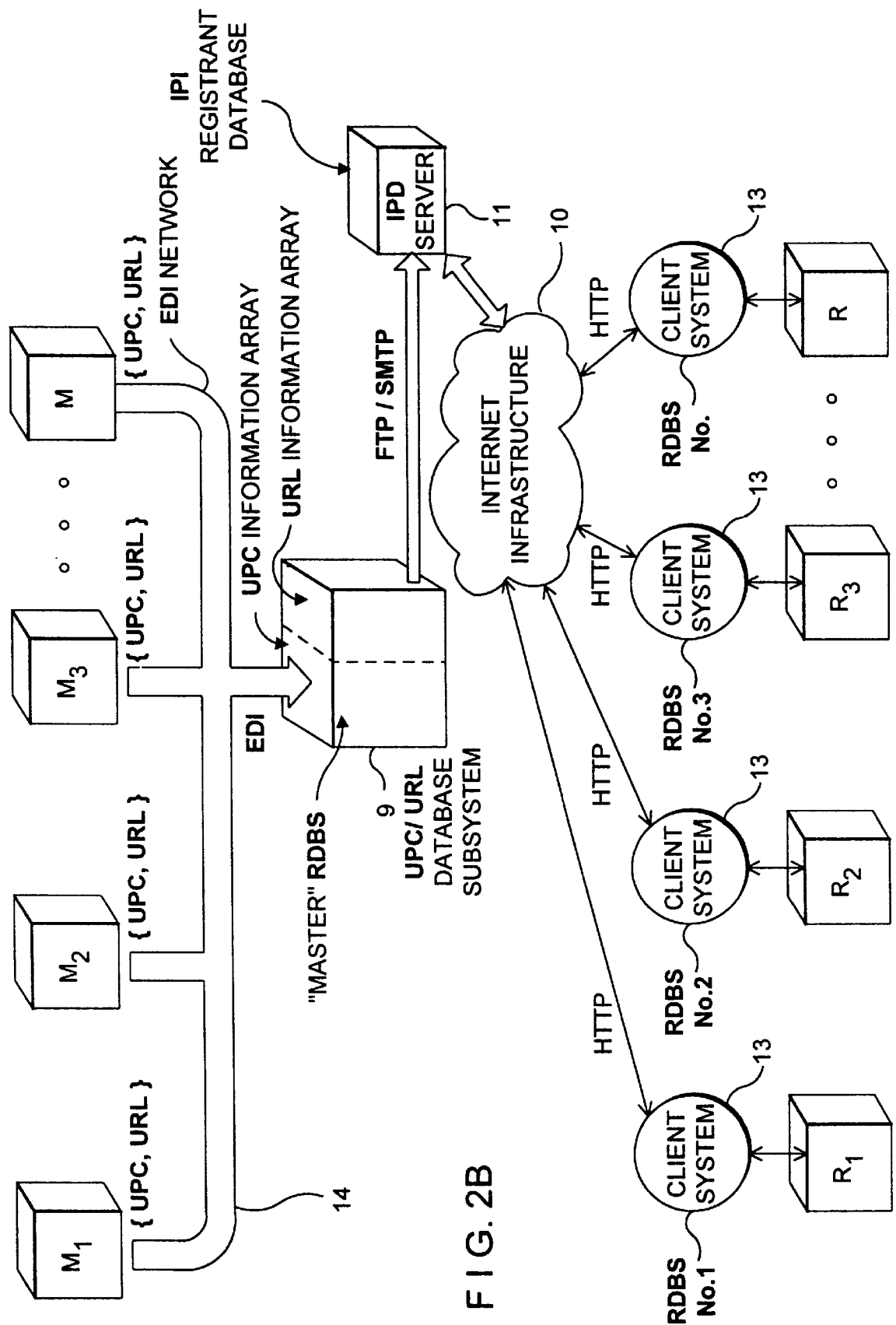
F I G. 2B

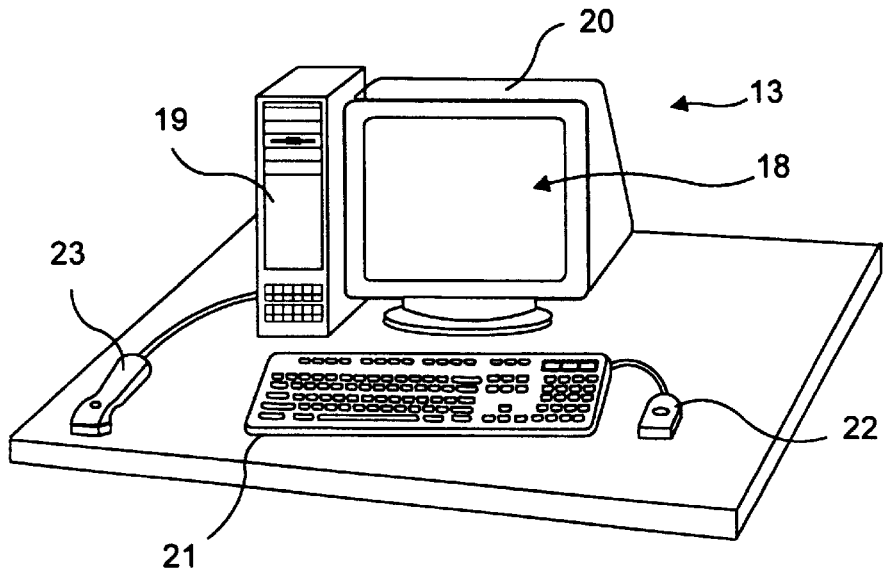
F I G. 3A1
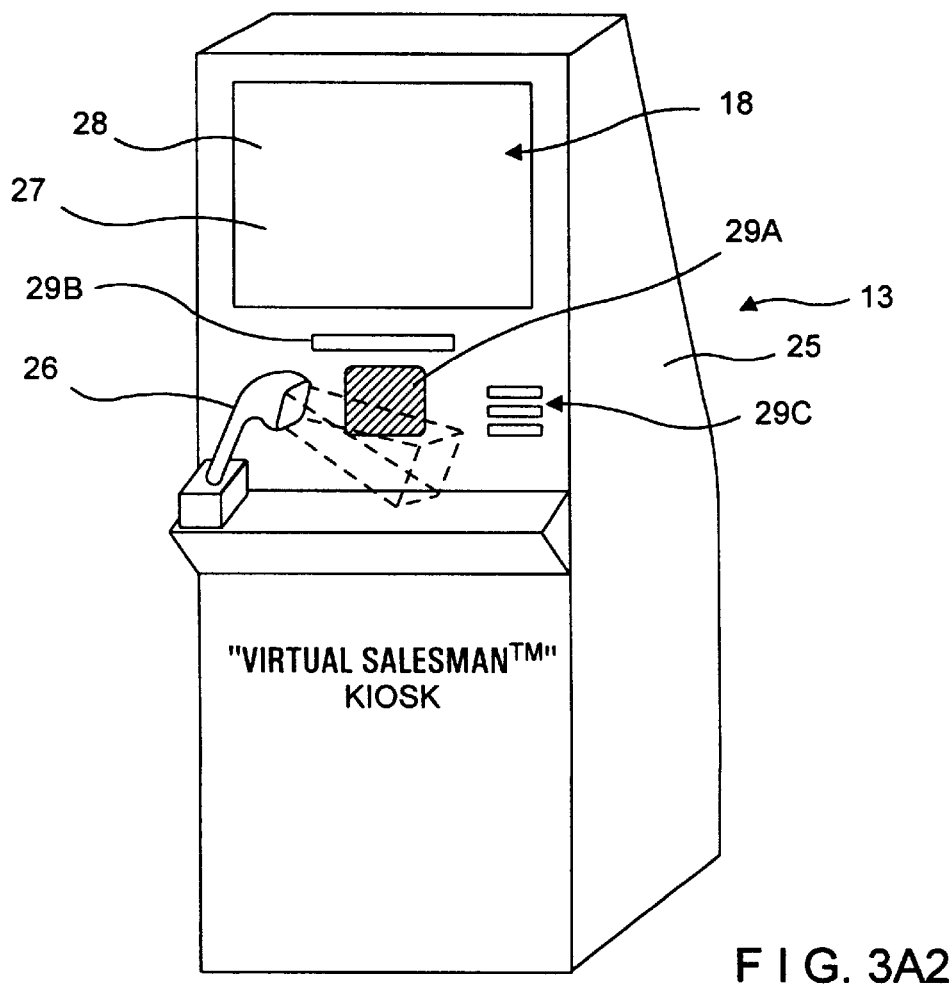
"VIRTUAL SALESMAN™"
KIOSK
F I G. 3A2

| IP/SN | REGISTRANT'S NAME | PRODUCT DESCRIPTION | UNIFORM RESOURCE LOCATOR (URL) | TRADE/SERVICE MARKS | E-MAIL ADDRESS | STATUS |
|---|---|---|---|---|---|---|
| 7/18908/17674/0 | APPLE COMPUTER, INC. CUPERTINO, CALF. | POWER MAC. 7600/120 PERSONAL COMPUTER | http://www.------/ | POWER MAC. | | |
| 0/373/100/6 | PROCTOR & GAMBLE | TOOTH PASTE | http://www.------/ | CREST | | |
| 3/12547/68404/0 | WARNER WELCOME | ACID REDUCER | http://www.------/ | ZANTAC, ZANTAC 75 | | |
| | | | | | | |
| 0/00005/17643/4 | KODAK, INC. | FILM PROCESSING | http://www.------/ | KODAK | | |
| | | | | | | |
| ... | ... | ... | ... | ... | ... | ... |
| 0/27242/51057/9 | SONY, INC. | PERSONAL COMPUTER | http://www.sony.com./pc | SONY | | |

F I G. 4A1

| URL$_j$ | PRODUCT SPECIFICATION INFORMATION FIELD | PRODUCT UPDATE INFORMATION FIELD | PRODUCT WARRANTY / SERVING INFORMATION FIELD | PRODUCT INCENTIVE INFORMATION FIELD | PRODUCT REVIEW INFORMATION FIELD | MISCELLANEOUS INFORMATION FIELD | PRODUCT ADVERTISEMENT INFORMATION FIELD |
|---|---|---|---|---|---|---|---|
| | | | | | | | |
| | | | | | | | |
| | | | | | | | |
| ... | ... | ... | ... | ... | ... | ... | ... |
| | | | | | | | |

FIG. 4A2

| IP/SN | REGISTRANT'S NAME | PRODUCT DESCRIPTION | TRADE/SERVICE MARKS | E-MAIL ADDRESS | STATUS |
|---|---|---|---|---|---|
| 7/05089/37460/7 | NETSCAPE COMMUNICATIONS CORP. | INTERNET NAVIGATOR | NETSCAPE, NAVIGATOR | | |
| 0/30000/01020/4 | QUAKER, INC. | OATMEAL | QUAKER | | |
| 0/496/390/1 | COLA COLA, INC. | COLA SODA | COCA - COLA, COKE | | |
| 0/77599/24245/2 | WARNER BROS. | PAT METHANY AUDIO CD | GEFFEN | | |
| ... | ... | ... | ... | ... | ... |

FIG. 4B

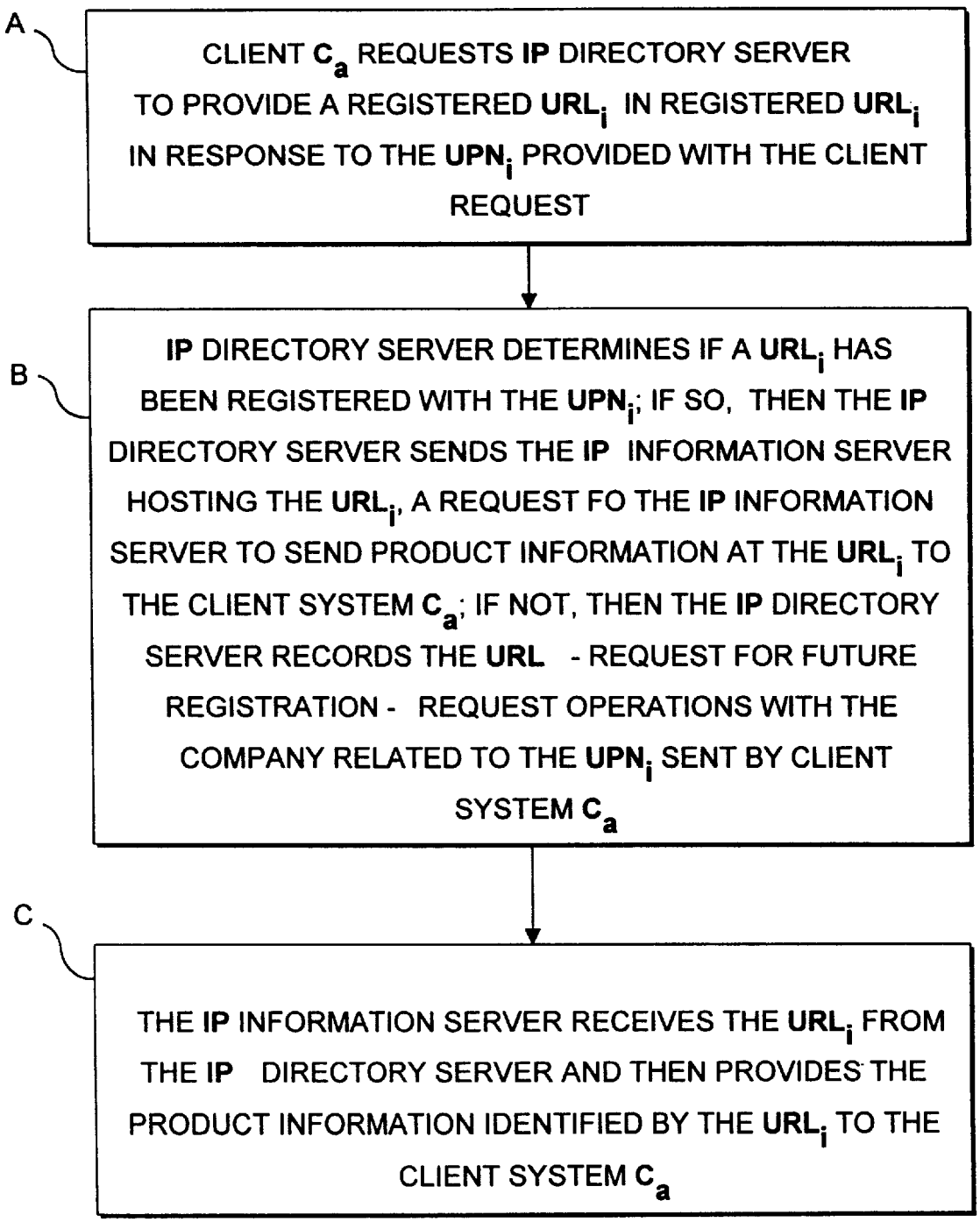
F I G. 8A

SYSTEM AND METHOD FOR DELIVERING CONSUMER PRODUCT RELATED INFORMATION TO CONSUMERS WITHIN RETAIL ENVIRONMENTS USING INTERNET-BASED INFORMATION SERVERS AND SALES AGENTS

RELATED CASES

This is a Continuation-in-Part of copending application Ser. No. 08/826,120 entitled "System And Method For Collecting Consumer Product Related Information And Transmitting And Delivering The Same Along The Retail Supply And Demand Chain Using The Internet" filed Mar. 27, 1997, which is a Continuation of Ser. No. 08/752,136 entitled "System And Method For Finding Product and Service Related Information On The Internet" filed Nov. 19, 1996; which is a Continuation-in-Part of copending application Ser. No. 08/736,798 entitled "System And Method For Finding Product and Service Related Information On The Internet" filed on Oct. 25, 1996; each said Application being incorporated herein by reference in its entirety as if set forth fully herein.

BACKGROUND OF INVENTION

1. Field of Invention

The present invention generally relates to a novel system and method for collecting consumer-product related information and transmitting and delivering the same along the consumer-product supply and demand chain using the National Information Infrastructure (e.g. the Internet), and more particularly to a novel system and method for delivering consumer product related information to consumers within retail environments using Internet-based information servers and sales agents.

2. Brief Description of the Prior Art

Dissemination of consumer-product information between manufacturers and their retail trading partners must be accurate and timely. The traditional methods of phone calls and faxes are time consuming and resource intensive. An electronic Universal Product Code (UPC) Catalog (i.e. database system), accessible 24 hours a day, is a solution. In 1988, QuickResponse Services (QRS), Inc. Of Richmond, Calif., introduced the first independent product information database, using the retail industry standard UPC numbering system. Today the QRSolutions™ Catalog contains information on over 44 million products from over 1500 manufacturers. The QRSolutions Catalog is a Window's based application providing a critical information flow link between the retailers and the manufacturers along the supply and demand chain.

After assigning a UPC number to each item, the manufacturer organizes and sends the data, via an electronic data interchange (i.e. EDI) transmission, or a tape, to QRS, Inc. to be loaded into the UPC Catalog database. Changes to the data can be made on a daily basis. Retailers with access to a manufacturer's data can view and download the data once it has been added or updated. Automatic update capabilities ensure the most recent UPC data will be in the EDI mailbox of each retailer customer quickly.

The effect of a centralized database such as QRS's UPC Catalog improves the flow of merchandise from the manufacturer to the retailer's selling floor and ultimately to the consumer. With the UPC Catalog, accurate, up-to-date product information is available when the retailer needs it, eliminating weeks from the order cycle time.

In addition to the electronic UPC-based product information subsystem (i.e. UPC Catalog) described above, a number of other information subsystems have been developed for the purpose of providing solutions to problems relating to electronic commerce merchandising and logistics within the global supply chain. Such ancillary information subsystems include, for example: Sales and Analysis and Forecasting Subsystems for producing and providing retailers with information about what products consumers are buying; Collaborative Replenishment Subsystems for determining what products retailer can be buying in order to satisfy consumer demand at any given point of time; and Transportation and Logistics Information Subsystems for producing and providing retailers with information about when products purchased by them (at wholesale) will be delivered to the their stores. Typically, such information subsystems are connected to various value added information networks in order to efficiently offer such information services to retailers on a global basis.

While the above-described information systems collectively cooperate to optimize the process of moving raw materials into finished products and into the hands of consumers, such information systems simply fail to address the information needs of the consumers of retail products who either require or desire product-related information prior to as well as after the purchase of consumer-products.

Presently, an enormous amount of time, money and effort is being expended by companies in order to advertise and sell their products and services, and after product purchase has taken place, to provide product related information, product warranty service and the like. For decades, various types of media have been used to realize such fundamental business functions.

In recent times, there has been a number of significant developments in connection with the global information network called the "Internet", which has greatly influenced many companies to create multimedia Internet Web-sites in order to advertise, sell and maintain their products and services. Examples of such developments include, for example: the World Wide Web (WWW) based on the Hypertext Markup Language (HTML) and the Hypertext Transmission Protocol (HTTP) by Tim Berners-Lee, et al.; easy to use GUI-based Internet navigation tools, such as the Netscape® browser from Netscape Communications, Inc., the Internet Explorer™ browser from MicroSoft Corporation and the Mosaic™ browser from Spyglass Corporation; and the Virtual Reality Modelling Language (VRML) by Mark Pecse. Such developments in recent times have made it very easy for businesses to create 2-D Hypermedia-based Home Pages and 3-D VR Worlds (i.e. 3-D Web-sites) for the purpose of projecting a desired "corporate image" and providing a backdrop for financial investment solicitation as well as product advertising, sales and maintenance operations.

Presently, a person desiring to acquire information about any particular product has a number of available search options. In particular, he or she may attempt to directly contact the manufacturer, wholesaler or reseller by telephone, US mail, e-mail, or through the company's World Wide Web-site (WWW), if they have one. In the event one decides to acquire product information through the seller's WWW site, he or she must first determine the location of its WWW site (i.e. Internet address) which oftentimes can involve using Internet Search engines such as Yahoo®, AltaVista™, WebCrawler™, Lycos™, Excite™, or the like. This can be a very time consuming process and sometimes leads to a dead end. Once the Internet address is obtained, one must then review the home page of the company's Web-site in order to find where, if at all, information about a particular product resides on the Website. This search process can be both time consuming and expensive (in terms of Internet time) and may not turn up desired information on the product of interest.

In some instances, product brochures bear a preprinted Internet address designed to direct or point prospective customers to a particular Web-site where more detailed product information can be found. A recent example of this "preprinted Web Address" pointing technique is the 1996 product brochure published by the Sony Corporation for its Sony® PCV-70 Personal Computer, which refers prospective customers to the Sony Web Address "http://www.sony.com/pc". While this approach provides a direct way of finding product related information on the Internet, it is not without its shortcomings and drawbacks.

In particular, when a company improves, changes or modifies an existing Web-site which publishes product and/or service advertisements and related information, it is difficult (if not impossible) not to change the Internet locations (i.e. Web addresses) at which such product and/or service advertisements and related information appear. Whenever a company decides or is forced to change any of its advertising, marketing and/or public relations firms, there is a substantial likelihood that new Web-sites will be created and launched for particular products and services, and that the Web addresses of such new Web-sites will no longer correspond with the Web addresses on preprinted product brochures in currently circulation at the time. This can result in pointing a consumer to erroneous or vacant Web-sites, that present either old or otherwise outdated product and/or service information, possibly adversely influencing the consumer's purchasing decision.

Moreover, when a company launches a new Web-site as part of a new advertising and marketing campaign for a particular product, any preprinted advertising or marketing material relating to such products will not reflect the new Web-site addresses which the campaign is attempting to get consumers to visit. This fact about preprinted advertising media renders it difficult to unify new and old advertising media currently in circulation into an advertising and marketing campaign having a coherent theme. In short, the inherently static nature of the "preprinted Web address" pointing technique described above is wholly incapable of adjusting to the dynamic needs of advertising, marketing and public relations firms alike.

In addition to the above-described techniques, I-World by Mecklermedia has recently launched a commercial product finding database on the Internet called "Internet Shopper". Notably, the "Internet Shopper" database is organized by specific types of product categories covering computer and telecommunication related technologies. While this product information finding service may be of help to those looking to buy computer or communication equipment, it fails to provide an easy way to find information on previously purchased products, or on products outside of the field of communication or computer technology. Consequently, the value of this prior art technique is limited to those considering the purchase of products catalogued within the taxonomy of the "Internet Shopper" directory.

In view of the inherent limitations of I-World's "Internet Shopper" and other product finding directories on the Internet, such as "NetBuyer" by Computer Shopper (at "http://www.netbuyer.com"), the National Information Infrastructure Testbed (NIIT) organization has recently formed a "confidential committee of NIIT members" under the title "Universal Product and Service Code Project". The stated problem addressed by this Project is how to locate specific goods and services on the Internet, and compare prices and other critical market information. As publicized in a NIIT Project Abstract, the "Universal Product and Service Code Project" seeks to make it easier to electronically locate goods and services on the Internet using universal product and services identifiers and locators. As stated in the Project Abstract, the "NIIT believes that changing the way in which Internet information is organized is fundamental to solving this problem. In the Universal Product and Service Code Project, NIIT members are currently exploring how coding structures can help organize information about products accessible using the Internet. NIIT's goal is to inform the development of formalized coding standards that can be used nationally and internationally so that users can locate goods and services through simple searching and browsing methods. In turn, more advanced features, such as comparison shopping, can be added as "intelligent agent" software programs are refined to enable users to search and retrieve products linked to these structures."

While the NIIT's Universal Product and Service Code Project seeks ways of locating specific goods and services on the Internet, all proposals therefor recommend the development of formalized coding standards and searching and browsing methods which are expensive and difficult to develop and implement on a world-wide basis. Moreover, such sought after methods will be virtually useless to consumers who have already purchased products and now seek product related information on the Internet.

In summary, prior art "demand chain management systems" have provided: (i) procurement services consisting of UPC Catalogs accessible through the Internet and EDI networks; (ii) inventory management services consisting of replenishment, sales analysis and forecasting services; and (iii) distribution management services consisting of EDI and logistics management services. However, prior art "demand chain management systems" have fail to address the information needs of the consumers of retail products who either require or desire product-related information prior to 'as well as after' the purchase of consumer-products. Consequently, prior art demand chain management systems operate in an open-loop mode with a "break" in information flow cycle, disabling the manufacturers from communicating with the consumers in an efficient manner to satisfy consumer needs.

Thus, it is clear that there is great need in the art for an improved system and method for collecting product related information and transmitting and delivering the same between the manufacturers and retailers of products to the consumers thereof in various environments, while avoiding the shortcomings and drawbacks of prior art systems and methodologies.

OBJECTS AND SUMMARY OF INVENTION

Accordingly, a primary object of the present invention is to provide a novel method and apparatus for collecting product-related information and transmitting and delivering the same between the manufacturers and retailers of products to the consumers thereof in retail shopping environments as well as at home, at work and on the road, while overcoming the shortcomings and drawbacks of prior art systems and methodologies.

Another object of the present invention is to provide such apparatus in the form of novel consumer-product information collection, transmission and delivery system.

Another object of the present invention is to provide such a system with an Internet-based product information database subsystem which, for each commercially available consumer-product, stores a number of information elements including: the name of the manufacturer; the Universal Product Code (UPC) assigned to the product by the manufacturer; one or more URLs specifying the location of information resources (e.g. Web-pages) on the Internet relating to the UPC-labelled consumer-product; and the like.

Another object of the present invention is to provide such a system, in which the URLs stored in the Internet-based product information database are categorically arranged and displayed according to specific types of product information (e.g., product specifications and operation manuals; product wholesalers and retailers; product advertisements and promotions; product endorsements; product updates and reviews; product warranty/servicing; related or complementary products; product incentives including rebates, discounts and/or coupons; etc.) that relates to the kind of information required, desired or otherwise sought by consumers, wholesalers, retailers and/or trading partners.

Another object of the present invention is to provide such a system, wherein the information maintained within the Internet-based product information database subsystem provides a manufacturer-defined consumer-product directory that can be used by various persons along the retail supply and demand chain.

Another object of the present invention is to provide such a system, wherein the manufacturers of consumer-products are linked to the retailers thereof in the middle of the supply and demand chain by allowing either trading partner to access consumer-product information from the Internet-based product information database virtually 24 hours a day, seven days a week.

Another object of the present invention is to provide such a system, wherein consumer-product manufacturers, their advertisers, distributors and retailers are linked to the consumers of such products at the end of the supply and demand chain, by allowing such parties to access consumer-product information from the Internet-based product information database subsystem virtually 24 hours a day, seven days a week.

Another object of the present invention is to provide such a system and method of using the same, which will accelerate the acceptance of electronic commerce on the Internet and the development of the electronic marketplace, which can be used by consumers and small and large businesses alike.

Another object of the present invention is to provide a novel system and method for finding and serving consumer-product related information on the Internet.

Another object of the present invention is to provide such a system and method, wherein virtually any type of product can be registered with the system by symbolically linking or relating (i) its preassigned Universal Product Number (e.g. UPC or EAN number) or at least the Manufacture Identification Number (MIN) portion thereof with (ii) the Uniform Resource Locators (URLs) of one or more information resources on the Internet (e.g. the home page of the manufacturer's Web-site) related to such products.

Another object of the present invention is to provide such a system and method, wherein a Web-based document transport subsystem is provided for use by manufacturers as well as their advertisers and agents in registering the UPNs (e.g. UPC numbers) of their products and the URLs of the information resources related to such products.

Another object of the present invention is to provide such a system and method with an improved Internet browser or Internet application tool comprising an number of different modes, namely: an "Internet Product-Information (IPI) Finding" Button for entering the "IPI Finding Mode" of the system when it is selected; a "Universal Product Number (UPN) Search" Button for entering the "UPN Search Mode" when the "UPN Search" button is selected; and a "Product Registration" Button for the "Product Registration Mode" of the system when the "Product Registration" Button is selected.

Another object of the present invention is to provide such a system, wherein when the system is in its IPI Finder Mode, a predesignated information resource (e.g. advertisement, product information, etc.) pertaining to any commercial product registered with the system can be automatically accessed from the Internet and displayed from the Internet browser by simply entering the registered product's UPN into the Internet browser manually or by bar code symbol scanning.

Another object of the present invention is to provide such a system, wherein when the system is in its "UPN Search Mode", a predesignated information resource (e.g. advertisement, product information, etc.) pertaining to any commercial product registered with the system can be automatically accessed from the Internet and displayed from the Internet browser by simply entering the registered product's trademark(s) and/or associated company name into the Internet browser.

Another object of the present invention is to provide such a system, wherein a predesignated information resource pertaining to any commercial product having been assigned a Universal Product Number (UPN) can be accessed from the Internet and displayed from the Internet browser by simply selecting its IPI Find button and then entering the UPN numeric string into a dialogue box which pops up on the display screen of the Internet browser program.

Another object of the present invention is to provide such a system in which a relational database, referred to as "an Internet Product Directory (IPD)," is realized on one or more data-synchronized IPD Servers for the purpose of registering product related information, namely: (i) information representative of commercial product descriptions, the trademarks used in connection therewith, the company names providing and/or promoting such products, the E-mail addresses of such companies, and the corresponding URLs on the Internet specifying current (i.e. up-to-date) Internet Web-site locations providing product-related information customized to such products.

Another object of the present invention is to provide such a product information finding and serving system, wherein the URLs symbolically linked to each registered product in the IPD Servers thereof are categorized as relating primarily to Product Advertisements, Product Specifications, Product Updates, Product Distributors, Product Warranty/Servicing, and/or Product Incentives (e.g. rebates, discounts and/or coupons), and that such URL categories are graphically displayed to the requester by way of easy-to-read display screens during URL selection and Web-site connection.

Another object of the present invention is to provide a novel method of carrying out electronic-type commercial transactions involving the purchase of products which are advertised on the Internet at uniform resource locations (URLs) that are registered with the IPI system of the present invention.

Another object of the present invention is to provide a novel system and method of finding the UPN or USN associated with any particular registered product, respectively, by simply selecting a GUI button on the Internet browser display screen in order to enter a "UPN Search Mode", whereby (i) a dialogue box is displayed on the display screen requesting any known trademarks associated with the product, and/or the name of the company that makes, sells or distributes the particular product, and (ii) the corresponding UPN (i.e. UPC number or EAN number) registered with the IPD Servers is displayed to the user for acceptance, whereupon the Internet Uniform Resource Locators (URLs) are automatically accessed from the IPD Servers and displayed on the display screen of the Internet browser for subsequent URL selection and Web-site connection.

Another object of the present invention is to provide such a system and method, wherein during the UPN Search Mode, the UPN (e.g. UPC or EAN number) associated with any registered product can be found within the database of the IPD Server using any trademark(s) and/or the company name commonly associated with the product.

Another object of the present invention is to provide a novel system and method for serving consumer-product related information to Internet users in retail shopping environments (e.g. departments stores, supermarkets, superstores, home-centers and the like) as well as at home, work or on the road.

Another object of the present invention is to provide such a system and method in the form of a computer-based kiosk installed within a retail shopping environment and having an automatic bar code symbol reader for reading the UPC numbers on consumer products being offered for sale in the store, and also a LCD touch-type display screen for displaying product-related information accessed from hyper-linked Web-sites on the Internet.

Another object of the present invention is to provide "virtual sales agents" with retail shopping environments by installing the computer-based kiosks of the present invention therein.

Another object of the present invention is to provide a novel method of constructing a relational database for use within the product information finding and serving subsystem of the present invention.

Another method of the present invention is to provide such a method of database construction, wherein the relational database is initially "seeded" with: (i) the Manufacturer Base UPC Numbers based on the six digit UPC Manufacturer Identification Numbers (MIN) assigned to the manufacturers by the UCC and incorporated into the first six characters of each UPC number applied to the products thereof; and (ii) the URLs of the Web-site home pages of such manufacturers.

Another method of the present invention is to provide such a method of database construction, wherein the "seeded" relational database is then subsequently extended and refined with the participation of each registered manufacturer (and/or agents thereof) by adding to the "seeded-"database (iii) the 12 digit UPC numbers assigned to each product sold thereby and the menu of URLs symbolically linked to each such corresponding product.

Another object of the present invention is to provide such a system and method, in which Web-site-based advertising campaigns can be changed, modified and/or transformed in virtually any way imaginable by simply restructuring the symbolic links between the products and/or services in the campaign using current (i.e. up-to-date) Web-site addresses at which Web-site advertisements and information sources related thereto are located on the Internet.

Another object of the present invention is to provide a novel system and method of automatically soliciting companies to register their products within the databases of such IPD Servers in order that product related information of a multimedia nature (e.g. Web-sites), once registered therewith, can be easily found on the Internet by anyone using the system and method of the present invention.

These and other objects of the present invention will become apparent hereinafter and in the Claims to Invention.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, wherein:

FIGS. 2A1 and 2A2 depict a schematic diagram of an illustrative embodiment of the consumer-product information collection, transmission and delivery system of the present invention shown embedded with the infrastructure of the global computer communications network known as the "Internet", and comprising a plurality of data-synchronized Internet Product Directory (IPD) Servers connected to the infrastructure of the Internet, a UPC/URL Database Subsystem (i.e. UPCIURL Catalog) connected to one or more of the IPD Servers and one or more globally-extensive electronic data interchange (EDI) networks, a Web-based Document Server connected to at least one of the IPD Servers and the Internet infrastructure, a Web-based Document Administration Computer connected to the Web-based Document Server by way of a TCP/IP connection, a plurality of Internet Product-Information (IPI) Servers connected to the infrastructure of the Internet for serving consumer-product related information to consumers in retail stores and at home, a plurality of Client Subsystems connected to the infrastructure of the Internet and allowing manufacturers to transmit consumer-product related information to the Web-based Document Server for collection and retransmission to the IPD Servers, and a plurality of Client Subsystems connected to the infrastructure of the Internet and allowing consumers in retail stores and at home to request and receive consumer-product related information from the IPD Servers;

FIG. 2A is a schematic diagram illustrating the flow of information along the consumer-product supply and demand chain, including (i) the communication link extending between the information subsystems of manufacturers of UPC-encoded products and the centralized (or master) UPC Catalog Database Subsystem of the consumer-product information collection, transmission and delivery system of the present invention, (ii) the communication link extending between the UPC/URL Database Subsystem and the IPD Servers of the present invention, (iii) the communication link extending between the IPD Servers and in-store Client Subsystems of retailers, (iv) the communication link extending between the IPI Servers and the in-store Client Subsystems of retailers, (v) the communication link extending between the IPD Servers and the Client Subsystems of consumers, and (vi) the communication link extending between the IPI Servers and the Client Subsystems of consumers;

FIG. 3A1 is a graphical representation of a first illustrative embodiment of the client computer system of the present invention, designed for use in desktop environments at home, work and play;

FIG. 3A2 is a graphical representation of a second illustrative embodiment of the client computer system of the present invention realized in the form of a multi-media kiosk, designed for use as a "virtual sales agent" in retail shopping environments such as department stores, supermarkets, superstores, retail outlets and the like;

FIG. 4A1 is a schematic representation of the relational-type IPI Registrant Database maintained by each IPD Server configured into the system of the illustrative embodiment of the present invention, showing the information fields for storing (i) the information elements representative of the UPN (e.g. UPC numeric data structure, EAN numeric data structure, and/or National Drug Code (NDC) numeric data structure), URLs, trademark(s) ($TM_i$), Company Name ($CN_i$), Product Description ($PD_i$) and E-Mail Address ($EMA_i$) thereof symbolically-linked (i.e. related) for a number of exemplary IPI Registrants listed (i.e. registered) with the IPI Registrant Database maintained by each IPD Server;

FIG. 4A2 is a schematic representation of the information subfield structure of the URL Information Field of the IPI Database of FIG. 4A1, showing the Product Advertisement Information Field, the Product Specification (Description/Operation) Information Field, the Product Update Information Field, the Product Distributor/Reseller/Dealer Information Field, the Product Warranty/Servicing Information Field, the Product Incentive Information Field thereof, the Product Review Information Field, the Related Products Information Field, and Miscellaneous Information Fields detailed in greater detail hereinafter;

FIG. 4B is a schematic representation of the relational-type Non-IPI Registrant Database maintained by each IPD Server that is configured into the IPI finding and serving subsystem of the illustrative embodiment of the present invention, showing the information fields for storing (i) the information elements representative of the Company Name ($CN_i$), Trademark(s) ($TM_i$) registered by the associated Company, and E-Mail Address ($EMA_i$) thereof symbolically-linked for a number of exemplary Non-IPI registrants listed within the Non-IPI Registrant Database maintained by each IPD Server;

FIG. 8A is a high level flow chart illustrating the steps involved in carrying out the communication protocol shown in FIG. 7A when the Client System is in its IPI Find Mode of operation.

DETAILED DESCRIPTION OF THE ILLUSTRATIVE EMBODIMENTS OF THE PRESENT INVENTION

Figure 1:
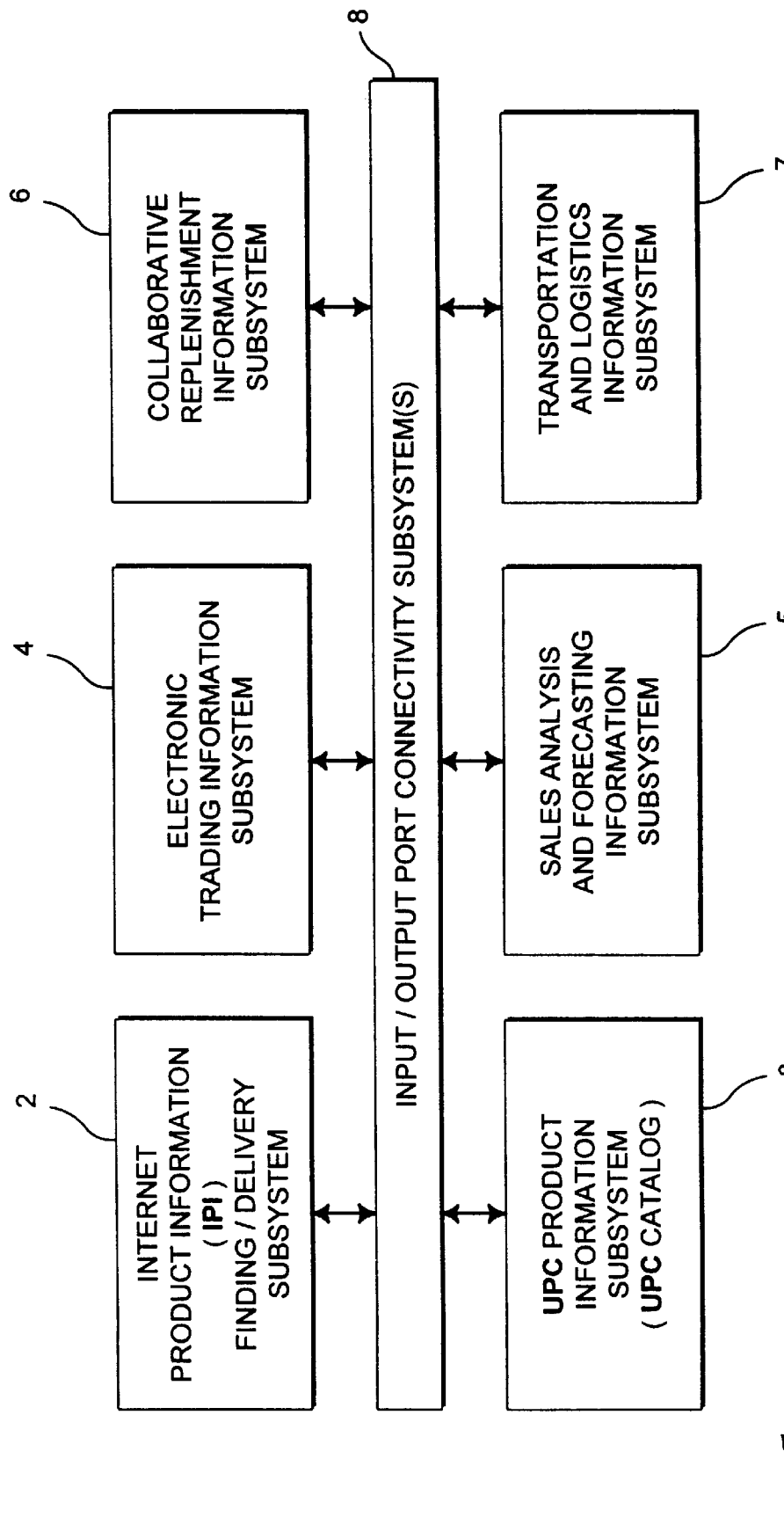
FIG. 1 is a schematic diagram illustrating the various information subsystems provided by the consumer-product information collection, transmission and delivery system of invention along the consumer-product demand chain, namely an Internet-based Product-Information (IPI) Finding and Serving Subsystem, a UPC-based Product-Information Subsystem ("UPC Catalog"), an Electronic Trading Information Subsystem, a Sales Analysis and Forecasting Information Subsystem, Collaborative Replenishment Information Subsystem, and a Transportation and Logistics Information Subsystem.

Referring to the figures shown in the accompanying Drawings, like structures and elements shown throughout the figures thereof shall be indicated with like reference numerals.

Overview Of The System Of The Present Invention

As illustrated in FIG. 1, the consumer-product information collection, transmission and delivery system of the present invention is generally indicated by reference numeral 1 and comprises an integration of information subsystems, namely: an IPI finding and serving subsystem 2 for allowing consumers to find product related information on the Internet (e.g. WWW) at particular Uniform Resource Locators (URLs), using UPC numbers and/or trademarks and tradenames symbolically-linked or related thereto; a UPC Product-Information Subsystem ("UPC Catalog") 3 for providing retailers with accurate up-to-date product information on numerous consumer-products offered for wholesale to retailers by manufacturers registering there products therewith; a Electronic Trading Information Subsystem 4 for providing trading partners (e.g. a manufacturer and a retailer) to sell and purchase consumer goods by sending and receiving documents (e.g. purchase orders, invoices, advance slip notices, etc.) to consummate purchase and sale transactions using either EDI transmission or Web-based electronic document communications; a Sales Analysis and Forecasting Information Subsystem for providing retailers with information about what products consumers are currently buying at retail stores or expect to be buying in the near future; Collaborative Replenishment Information Subsystem 6 for determining what products retailers can be buying in order to satisfy consumer demand at any given point in time; a Transportation and Logistics Information Subsystem 7 for providing retailers with information about when ordered products (purchased by retailers at wholesale) will be delivered to the retailer's stores; and Input/Output Port Connecting Subsystems 8 for interconnecting the input and output ports of the above-identified subsystems through the infrastructure of the Internet and various value-added EDI networks of global extent. Notably, unlike prior art supply chain management systems, the consumer-product information collection, transmission and delivery system of the present invention embraces the manufacturers, retailers, and consumers of UPC-encoded products, and not simply the manufacturers and retailers thereof. As will become apparent hereinafter, this important feature of the present invention allows manufacturers and retailers to deliver valuable product related information to the consumers of their products, thereby increasing consumer purchases, consumer satisfaction and consumer loyalty. Prior art supply chain management systems simply have no way or means of providing such information services to the consumers of UPC-encoded products along the consumer-product supply and demand chain.

As shown in FIGS. 2A1 and 2A2, the consumer-product information collection, transmission and delivery system illustrated in FIG. 1 is realized as an arrangement of system components, namely: a central UPC/URL Database Subsystem 9 for storing and serving various types of consumer-product information to retailers and consumers alike (e.g. the name of the product's manufacturer; the Universal Product Code (UPC) assigned to the product by the manufacturer; one or more URLs specifying the location of information resources on the Internet at which particular kinds of information relating to the consumer-product can be found; merchandise classification; style number; tradename; information specifying the size, color and other relevant characteristics of the consumer-product, where applicable; ordering criteria; availability and booking dates, etc.); a globally-based (packet-switched) digital telecommunications network (such as the Internet) 10 having an infrastructure including Internet Service Providers (ISPs), Network Service Providers (NSPs), routers, telecommunication lines, channels, etc., for supporting packet-switched type digital data telecommunications using the TCP/IP networking protocol well known in the art; one or more Internet Product Finding Directory (IPD) Servers, each indicated by reference numeral 11 and being connected to the Internet at strategically different locations via the Internet infrastructure 10 and data-synchronized with each other in order that each such Server maintains a mirrored database structure as represented in FIGS. 4A and 4B; a plurality of Internet Product-Information (IPI) Servers, each indicated by reference numeral 12 and being connected to the Internet via the Internet infrastructure; a plurality of User (or Client) Computers, each indicated by reference numeral 13, being connected to the Internet via the Internet infrastructure and available to consumers ($C_1, C_2, C_3, \ldots, C_i$); one or more data communication (i.e. EDI) networks 14, comprising data collection nodes 15 and communication links 16, operably connected to the centralized UPC/URL Database Subsystem 9, each Client Computer 13 available to a Manufacturer ($M_1, M_2, M_3, \ldots, M_j$) and Retailer ($R_1, R_2, R_3, \ldots, R_k$) within the retail supply and demand chain; a Web-based Document Server 30 connected to at least one of the IPD Servers 11 and the Internet infrastructure, for transferring documents and messages to remote Client Computer Systems during the registration of manufacturers and consumer products with the system hereof and periodically updating product-related information with the IPD Servers 11 in an automatic manner; and a Web-based Document Administration Computer 31 connected to the Web-based Document Server 30 by way of a TCP/IP connection 32, for administrating the registration of manufacturers and products with the system, initiating the transfer of consumer product related information (e.g. menu of URLs) between the remote Client Computer Systems and Web-Based Document Server 30, transferring such information to the IPD Servers 11, and maintaining local records of such information transfers and the like.

Preferably, the central UPCJURL Database Subsystem 9 and at least one of the IPD Servers 11 are located at a secured information storage/processing center 17, along with a multiprocessor (or mainframe) computer system, information servers, routers, data communication lines, disk storage devices (e.g. RAIDs), tape drives and tape-library system, uninterrupted power supplies (UPS), and other peripheral technology to provide on-line, batch and back-up operations. However, the IPI Servers, the Client Computers and the other IPD Servers (if provided for database mirroring purposes), typically will be located throughout the world, as the distribution of manufacturers, retailers and consumers who are encouraged to use the system are scattered across the Planet.

In the illustrative embodiment, the Web-based Document Server 30 is a Windows NT Server running WebDox™ Server software from Premenos Corporation of Concord, Calif. The Windows NT Server can be realized using a suitable computer system having a Pentium® or higher CPU, 64 MB of RAM or higher, running (i) Microsoft Windows NT Server 4.0 or higher Operating System software from Microsoft Corporation, (ii) Microsoft Internet Information Server 2.0 or higher from Microsoft Corporation, and (iii) Microsoft SQL Server 6.5 or higher software from Microsoft Corporation. Also, the WebDox™ Server is provided with a dedicated Internet connection (i.e. ISDN or better) to the Internet infrastructure 33.

The EDI administration computer 31 is either a Windows 95 or Windows NT Computer system running WebDox Admin™ software from Premenos Corporation of Concord, Calif. The Windows 95 or Windows NT computer system 31 can be realized using a suitable computer system having an Intel 486 or higher CPU, 12 MB of RAM or higher, running Microsoft Windows 95 or Windows NT 4.0 or higher, and having a TCP/IP connection 31 to the WebDoX™ Server 30.

In order to use the WebDox™ system, each remote Client Computer System 13 includes either a Windows 95 or Windows NT Computer system running WebDox Remote™ software from Premenos Corporation of Concord, Calif. The Windows 95 or Windows NT computer system 13 can be realized using a suitable computer system having a Intel 486 or higher CPU, 16 MB of RAM or higher, and a VGA monitor or better, and running (i) Microsoft Windows 95 or Windows NT 3.51 or higher Operating System (OS) software, and (ii) Microsoft Internet Explorer 3.0 or higher from Microsoft Corporation. Also, the WebDox Remote™

Server is provided with a dial-up Internet connection (i.e. 14,400 bps or better) to the Internet infrastructure. The function of the Web-based Document Server 30, Web-based Administration System 31 and remote client systems 13 running the Premenos® WebDox Remote™ software is to provide a Web-based Document Transport System for automatically transferring information (e.g. UPC/URLs) from manufacturers to the IPD Servers of the system in order to periodically update the same. While the illustrative embodiment of this Web-based Document Transport System has been described in terms of its implementation using the WebDox™ system from Premenos, it is understood that other commercially available electronic document transport systems (e.g. COMMERCE:FORMS™ Electronic Business Forms Package from Sterling Commerce, Inc., http://www.stercomm.com) can be used to carry out this subsystem. The operation of this Web-Based Document Transport System will be described in detail hereinafter with respect to the collection and delivery of consumer product related information to the IPDs hereof.

The major subsystem components comprising the consumer-product information collection, transmission and delivery system of the present invention will be described in greater detail below.

In the illustrative embodiment of the present invention, the UPC Product-Information Subsystem 2 is realized using the UPC/URL Catalog Database Subsystem 9 and data communication networks 14 of the enabling technology platform shown in FIGS. 2A1 and 2A2. Preferably, the product procurement services delivered by the UPC/URL Catalog Database Subsystem 9 are provided by modifying the prior art QRSolutions UPC Catalog currently implemented by QuickResponse Services, Inc., so that this subsystem includes the database structures (i.e. information fields and data elements) of the IPD Database Server 11 which are neither found in or suggested by the prior art QRSolutions UPC Catalog. The structure and operation of the UPCIURL Catalog Database Subsystem and IPD Server of the present invention will be described in greater detail hereinafter. The information services supported by the UPC Product-Information Subsystem 3 include those provided by the prior art QRSolutions UPC Catalog, and also a number of additional information services that can be used to carry out Product Registration within the IPI finding and serving subsystem of the present invention. These additional information services will be described in greater detail hereinafter with reference to FIG. 2B.

The Electronic Trading Information Subsystem 4 is realized using the UPC/URL Catalog Database Subsystem 9, Client Computer Systems 13 and data communication networks 14 of the enabling technology platform shown in FIGS. 2A1 and 2A2. Preferably, the inventory procurement services delivered by the Electronic Trading Subsystem 4 are provided by the prior art QRSolutions Econnect and Electronic Data Interchange Services currently being implemented by QuickResponse Services, Inc.

Sale Analysis and Forecasting Information Subsystem 5 is realized using information storage/processing center 1, Client Computer Systems 13, and the data communication networks 14 of the enabling technology platform shown in FIGS. 2A1 and 2A2. Preferably, the product inventory management services delivered by the Sale Analysis and Forecasting Information Subsystem 5 are provided by the prior art QRSolutions Sale Analysis and Forecasting Information Services currently being implemented by QuickResponse Services, Inc.

The Collaborative Replenishment Information Subsystem 4 is realized using information storage/processing center 17, Client Computer Systems 13 and the data communication networks 114 of the enabling technology platform shown in FIGS. 2A1 and 2A2. Preferably, the product inventory management services delivered by the Collaborative Replenishment Information Subsystem 6 are provided by the prior art QRSolutions Replenishment Services currently being implemented by QuickResponse Services, Inc.

The Transportation and Logistics Information Subsystem 7 is realized using information storage/processing center 17, Client Computer Systems 13, and the data communication networks 14 of the enabling technology platform shown in FIGS. 2A1 and 2A2. Preferably, the product distribution management services delivered by the Transportation and Logistics Information Subsystem 7 are provided by the prior art QRSolutions EDI and Logistics Management Services currently being implemented by QuickResponse Services, Inc.

Figure 3B:
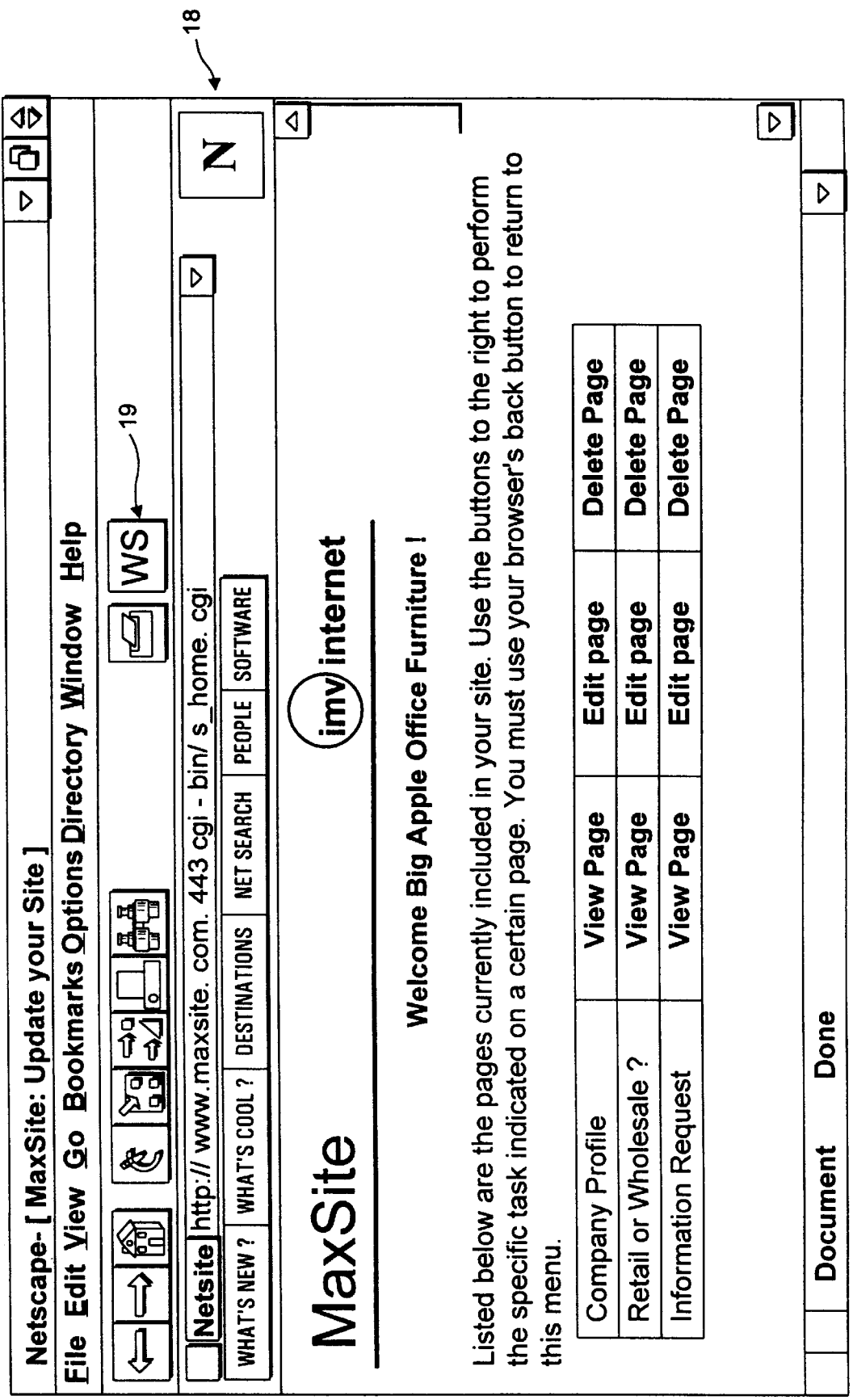
FIG. 3B is a schematic representation of an exemplary display screen produced by a graphical user interface (GUI) based web browser program running on a Client System and providing an on-screen IPI Find button.
Figure 3C:
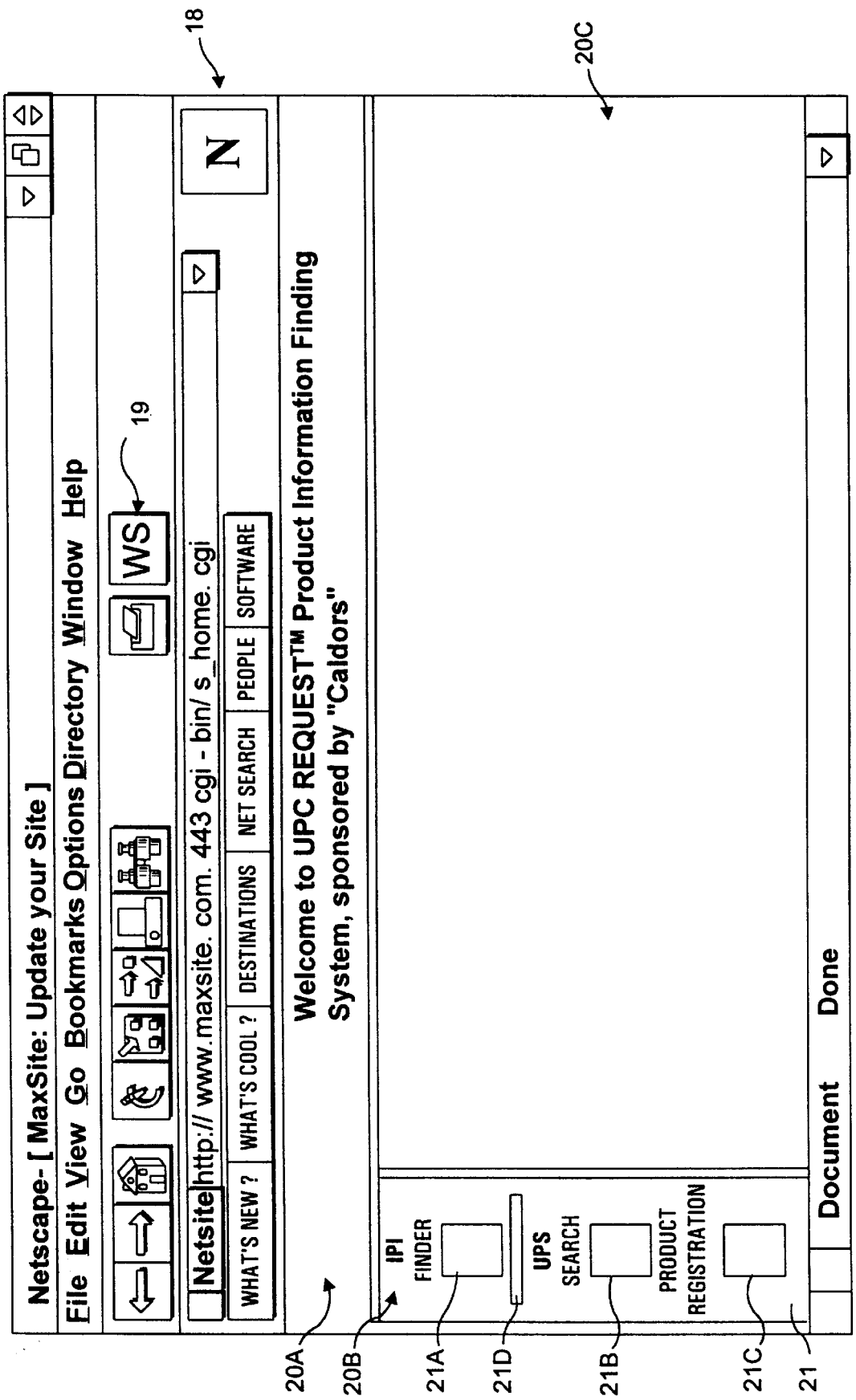
FIG. 3C is a schematic representation of an exemplary display screen produced by a GUI-based Internet browser or communication program supporting a Netscape-style browser "display framework", providing an ultra-compact on-screen IPD Web-site control panel having an IPI Find button, an UPN Search Button, and a Product Registration Button carrying out the method of the present invention.

In the illustrative embodiment of the system of the present invention, each Client Computer 13 has a conventional GUI-based web browser program (e.g. Netscape, Internet Explorer, Mosaic, etc.) with a plug-in type module, such as CyberFinder™ navigational software by Aladdin Systems, Inc., of Watsonville, Calif., that provides an on-screen graphical icon for a "IPI Web-site Find" function. An exemplary display screen 18 produced by such a GUI-based web browser program is set forth in FIG. 3B. Alternatively, the URL of the home page of the IPI Web-site can be recorded as a browser "bookmark" for easy recall and access through a conventional GUI-based Internet browser. Once at the home page of the IPI Web-site, an Internet user can find product-related information on the Internet in essentially the same way as when using the web browser program of FIG. 3B. As shown, the on-screen IPI Web-site Find Icon 19 functions as an "IPI Web-site Find" Button for instantly connecting the Client System to the IPI Web-site (i.e. hosted on each mirrored IPD Server) and carrying out the IPI finding and serving method of the present invention. The URL for the home page of the IPI Web-site can be selected with marketing considerations in mind, for example, "http://www.ipf.com" or "http://www.upcrequest.com" similar in form with the URLs of other information search-engines and directories currently available on the Internet. Upon selecting the IPI Web-site Find Button 19 (e.g. by a clicking of the mouse thereon shown in FIG. 3B), the user is automatically connected to the home-page of the IPI Web-site (hosted on each mirrored IPD Server) which, as shown in FIG. 3C, supports a Netscape-style "framework", within which webpages accessed through the IPI web-site are displayed. An excellent tutorial on "framing" entitled "TheE Netscape Frames Tutorial™ (2nd edition)" by Charlton D. Rose set forth at the URL: "http://www.newbie.net/frames/", lasted visited by Applicant on Mar. 26, 1997.

As shown in FIG. 3C, the IPS Web-site of the illustrative embodiment has a framework characterized by three-display fields 20A, 20B and 20C for displaying web pages. In alternative embodiments, there may be more or less display frames than that shown in FIG. 3C. Each frame acts as a separate display screen where variables such as web-pages, scrolling, page colors, etc., are independently controllable. In practice, it is suggested that the physical layout of the Netscape-style browser "framework" be designed to simultaneously accommodate the needs of the consumers using the particular Client Subsystems of the present invention, as well as the needs of the retailers who typically will host client subsystems hereof either (1) physically within their stores, and/or (2) electronically on their WWW sites using Web browser framing techniques as well.

In the case of Client Subsystems physically hosted (i.e. located) within the environment of retail stores, a three-field browser framework as shown in FIG. 3C will be highly effective in meeting the needs of the retailer, consumer, and business organization delivering the IPI finding and serving subsystem of the present invention (hereinafter the "IPI Provider"). As shown in FIG. 3C, the first (top-most) display field 20A can be used to display to the consumer, a Web page containing a message that the IPI finding and serving subsystem is being delivered to the consumer by the IPI Provider under, for example, the sponsorship of either: (1) the hosting retailer; (2) one or more advertisers posting advertising "banners"in the display frame 20A; or (3) the consumer him or herself by paying a subscription fee or the like. Understandably, the method of sponsorship employed will vary from embodiment to embodiment of the present invention. An exemplary message for this display screen might read, for example, as follows:

"Welcome to the UPC Request™ Consumer Product-Information Finding and Serving System sponsored by THE HOME DEPOT for your shopping convenience and pleasure."

The height of this display field 20A need only be a small fraction of the consumer's display screen (e.g. ¾ inches) to convey this message to the consumers during use of the IPI finding and serving subsystem of the present invention within the retailer's real (or virtual) shopping environment.

As shown in FIG. 3C, the second (left-most) display field 20B is used to display a GUI-based "control panel" 21 for the IPI finding and serving subsystem of the present invention. In the illustrative embodiment, this control panel 21 includes the IPI Find Button 21A, the UPN (e.g. UPC) Search Button 21B, and the Product Registration Button 21C which are activatable whenever the IPI Web-Site (i.e. IPD Server 11) has been accessed through an Internet browser program running on a Client Computer Subsystem. When selected, the IPI Find Button 21A activates the IPI Finding Mode of the IPI finding and serving subsystem. When selected, the UPC Search Button 21B activates the UPN Search Mode of the IPI finding and serving subsystem. When selected, the Product Registration Button 21C activates the Product Registration Mode of the IPI finding and serving subsystem. Each of these modes will be described in great detail hereinafter.

As shown in FIG. 3C, the third display field 20C, occupying a substantial portion of the entire browser display screen, is used to display (1) Web pages that are served from the IPD Server 11 and are associated with the operation of either the IPI Find Mode, the UPC Search Mode or the Product Registration Mode of the system, and (2) Web pages that are served from the IPI Servers 11 and are associated with products registered with the IPI finding and serving subsystem.

As will become apparent hereinafter, the three-field Netscape-style display framework employed within the IPI finding and serving subsystem of the illustrative embodiments provides a unique way to satisfactorily address the needs of consumers, hosting retailers, manufacturers and the IPI Provider(s) alike. It is understood, however, that in some embodiments of the present invention, Client Computers may not employ "framed" browser display screens without detracting from the present invention.

In the illustrative embodiment, each synchronized IPD Server 11 can be realized by, for example, the PowerMac® 8550/200 Internet Server from Apple Computer, Inc., the Origin 200 Server, the $O_2$ Desktop Workstation from Silicon Graphics, Inc, or any other suitable computing machine that can perform the function of a HTTP server in the web-based, client-server type computer system architecture of the illustrative embodiment. As shown in FIG. 1, each IPD Server is interfaced with an ISP 10A in a conventional manner. The actual number of IPD Servers used in any particular application will depend on various factors including, for example, user demand, Internet traffic conditions, network router capacity and performance, etc. Each such IPD Server is assigned a static IP address and a common domain name on the Internet according to the Domain Name System (DNS) well known in the art. Each IPD Server is also provided with (i) Website development software for creating HTML-encoded pages for the IPI Web-site hereof, (ii) database software for creating and maintaining the IPI Registrant Database and the Non-IPI Registrant Database schematically illustrated in FIGS. 4A1 and 4B, respectively, and (iii) Web-Server software for supporting HTTP and serving information pages from the IPI Web-site and database requests from the IPI and Non-IPI Registrant Databases. Such databases, in practice realized as relational database management systems (RDBMS), can be constructed using a database programming language such as the 4th Dimension® SQL Language, the Sybase language, or any other suitable database language which allows for database programming and database connectivity over the Internet. A suitable development program for creating a dynamic Web-site with the integrated database structures of FIGS. 4A1, 4A2, and 4B is the "4D Web SmartServer" or 4D Version 6.0, both from ACI, Inc. It is understood, however, that database development programs such as Oracle, Sybase SQL, Powersoft, Microsoft Access 97, etc. can be used to construct and maintain the relational database management subsystems of the type illustrated in FIGS. 4A1, 4A2, and 4B. Data synchronization among such databases can be achieved using conventional data synchronization techniques well known in the art. In addition, a backup and mirroring program can be used to maintain data security. Preferably, the synchronized IPD Servers are maintained by a team of network managers under supervision of one or more webmasters.

Similarly, each IPI Server 12 can be realized by, for example, the PowerMac® 8550/200 Internet Server from Apple Computer, Inc., the Origin 200 Server or O2 Desktop Workstation from Silicon Graphics, Inc., or any other computing machine that can perform the function of a Server in a web-based, client-server type computer system architecture of the illustrative embodiment. As shown in FIGS. 2A1 and 2A2, each IPI Server is interfaced with an ISP 10A in a conventional manner. Each such IPI Server is assigned a static IP address and a unique domain name on the Internet. Each IPI Server is also provided with (i) Web-site development software for creating HTML-encoded multi-media pages for Web-site development, and (ii) Web-site server software for supporting HTTP and serving HTML-formatted pages of hypermedia-type Web-sites containing product related information of a multi-media nature. Such Web-sites can be expressed in HTML and/or VRML or any other suitable language which allows for Website construction and Web-site connectivity. Web-site management software, such as Adobe® SiteMill™, can be used to maintain correct hyper-links for any particular Web-site. Preferably, the IPI Servers are maintained by a team of network managers under supervision of one or more webmasters.

Each Client Computer Subsystem (hereinafter "Client System") 113 can be realized by any computing system employing operating system (OS) software (e.g. Macintosh, Windows 95, Windows NT, Unix, etc.) which supports an Internet browser program (e.g. Netscape Navigator, MicroSoft Internet Explorer, NCSC's Mosaic, etc.) which includes (1) Internet networking software that supports the TCP/IP networking protocol (required by HTTP, FTP and the like) and provides a GUI-based Web browser interface, and (2) Electronic Data Interchange (EDI) networking software that supports EDI between two or more Client Systems over the EDI network 14 illustrated in FIGS. 2A1 and 2A2. Alternatively, Client Systems may also be realized by any of the following systems: (i) a Newton MessagePad 130 (running the Newton 2.0 Operating System and NetHopper™ Internet Software); (ii) a Pippin™ computer system from Apple Computer, Inc.; (iii) a network computer (NC) that supports the Java™ programming language and Java applets expressed therewith; (iv) a Sony® WebTV Internet Terminal (supported by the WebTV Service provided by WebTV Network, Inc.); or the like. As shown in FIG. 1, each Client Computer is interfaced with an ISP 10A in a conventional manner. Each such Client System may be assigned a static IP address and a unique domain name on the Internet, or one may be dynamically assigned thereto by way of its ISP depending on its connectivity. Optionally, any Client System may include Web-site server software for creating and maintaining one or more hypermedia-type Web-sites in a manner well known in the art.

Typically, each Client System 13 will be maintained by either present 115 or future manufacturers, retailers and/or consumers of products, about which information can be found on the Internet. As shown in FIG. 3A1, any Client System of the present invention may be realized as a desktop computer workstation comprising: a processor and memory 19; a visual display monitor 20; a keyboard 21; a GUI mouse 22; and a bar code symbol reader 23 for reading UPC and other types of bar code symbols printed on products, brochures, documents, and the like.

As shown in FIG. 3A2, any Client Computer 13 may also be realized in the form of a Web-based multi-media kiosk, designed for use as a "virtual sales agent" within retail shopping environments. As shown, the Web-based kiosk of the present invention comprises: a floor, wall or ceiling supported housing 25; an onmidirectional laser bar code symbol reader (e.g. Metrologic MS 6720 Laser Scanner) 26 for reading UPC (and other type of) symbols printed on products, brochures, documents and the like; an active-matrix LCD-type visual display screen 27 for viewing product related information automatically displayed thereon in response to the entry of the UPC numbers scanned into the UPC Number Entry Window 21D below the IPI Finder button 21A of Control Strip 20B displayed on the Client System, as shown in FIG. 3A2; a touch-screen type keyboard and pointing device 28 for clicking on anchored links on Web pages, entering information into Client System during its use; audio-speakers 29A for supporting a multimedia Web-site that may be visited when using the Client System; a color or black/white printer for printer 29B for printing out Web pages under consumer command during an information finding session using the system; and also, one or more floppy-disc(s) (or otherwise removable) drive units 29C, accessible to the consumer for recording promotional and trial versions of information-based consumer products (e.g. video and audio recordings, computer softeware products, and the like) on removable information storage media (e.g. 1.44 MB floppy discs, 100 MB Zip® floppy discs, 1 GB Jazz® floppy discs, etc.) supplied by either the retailer or consumer. Optionally, the kiosk can be provided with a stereoscopic micropolarizing LCD panel from Vrex, Inc. of Elmsford, N.Y. so that micropolarized spatially-multiplexed images (SMIs) of 3-D objects represented with VRML-encoded Web pages can be stereoscopically perceived by consumers when viewed through either an electrically-passive polarizing visor structure supported from the housing of the kiosk, or a pair of polarizing eyeglasses tethered to the kiosk housing and donned by the consumer. Notably, by virtue of its compact size and low power requirements, this Web-based kiosk can be easily located in supermarkets, department stores, superstores, home-centers, discount retail outlets, or any other public location where consumer-products are being sold, offered for sale, and/or serviced.

In alternative embodiments, any Client Computer 13 can be realized as a network computer (NC), a Web-TV™ type Internet Terminal, a Newton MessagePad® PDA, or any other device providing Internet access to the IPI Web-site (i.e. mirrored IPD Servers) of the present invention. Notably, the same functionalities provided within the Web-based kiosk described above can be embodied with such alternative embodiments of client computer system.

The Database Structure of the IPD Server

In the illustrative embodiment of the present invention, each data-synchronized IPD Server 11 of the preferred embodiment maintains at least two different relational-type databases, namely: a IPI Registrant Database for storing information about manufacturers whose products are registered with the system; and a Non-IPI Registrant Database for storing information about manufacturers whose products are not registered with the system. A schematic representation of the IPI Registrant Database is shown in FIG. 4A1, whereas a schematic representation of the Non-IPI Registrant Database is shown in FIG. 4B.

As shown in FIG. 4A1, the relational-type IPI Registrant Database maintained by each IPD Server comprises a plurality of labelled information fields for each product "registered" therewith, namely: an IPN Information Field for storing information (e.g. numeric or alphanumeric string) representative of the Universal Product Number (e.g. twelve-digit UPC Version A number or eight-digit UPC Version E number) assigned to the consumer product; a Company Name Information Field for storing information (e.g. numeric or alphanumeric string) representative of the name of the company making, selling or distributing the corresponding product; a URL Information Field(s) for storing information (e.g. numeric or alphanumeric string) representative of the Universal Resource Locator (URL) or Universal Resource Locators (URLs) at which information resource(s) of the multimedia type can be found on the Internet relating to the corresponding consumer product; a Trademark Information Field for storing information (e.g. text and/or alphanumeric strings) representative of each trademark (or Domain Name) used in connection with the promotion, sale, distribution and/or use of the corresponding product, and preferably registered with the United States Patent and Trademark Office (USPTO) or other governmental or quasi-governmental agency (e.g. INTERNIC or Network Solutions, Inc.); a Product Description Information Field for storing information (e.g. text strings) descriptive of the corresponding product; an E-mail Address Information Field for storing information (e.g. numeric or alphanumeric string) representative of the e-mail address of the corresponding company (e.g. manufacturer) on the Internet; and a Status Information Field for storing information (e.g. numeric or alphanumeric string) representative of whether the company (e.g. manufacturer) associated registered product has paid their monthly, quarterly or annual registration fees associated with registration within the IPD Servers of the information finding and serving subsystem hereof. Notably, each information item contained with the information field shown along the same horizontal line of FIG. 4A1 are related or linked.

In general, the URL stored in the URL Information Field specifies the address of an information resource on the Internet (e.g. Web), and thus may point to any one of the following types of information resources: a HTML document or file on the World Wide Web (expressed in the HyperText Markup Language); a single record in a database; the front-end of an Internet program such as Gopher; or the results of a query made using another program. In accordance with convention, the syntactic structure of each URL generally comprises: a Protocol Specifier, such as "http", "ftp", "gopher", "news", or "mailto", and specifies the type of resource that the URL is pointing (i.e. connecting) to; a Host Indicator, represented by double slashes "//" if the URL is requesting information from a Web Server; Server Name comprising a Internet Domain Name (e.g. "www."), the address of the Web Server (e.g. "ibm."), and a designator (e.g. "com", "edu", "int", "mil", "net", "org", etc.) identifying who owns the server or where it is located; a Path Name, such as "Products/Computers/", indicating a path to the destination information file on the identified Server; and a Resource Name (including file extension, e.g. ".html"), such as "aptiva.html", identifying the actual named information file that contains actual information resource specified by the URL.

As used herein as well as in the Claims to Invention, the term "registered" and the variants thereof shall be understood to mean listed or having an entry within a database. Such listing or entry can be achieved in a variety of ways including, but not limited to: (i) by specific request of the associated company or business; or (ii) by the system administrator without a request and/or authorization of the corresponding company or business linked to the product.

Notably, each information item contained with the information field shown along the same horizontal line of FIG. 4A1 is symbolically related or linked. Different products of the same registrants or related registrant may also be linked together so that a user looking for information about a particular product is automatically provided URLs which are assigned to related products of the registrant which may satisfy the goals or objectives of a particular advertising and/or marketing campaign or product promotion program of the registrant company. As it may be desired to relate particular products at particular points in time, the relationships therebetween can be dynamically changed within the IPI Registrant Database by a straightforward database updating operation carried out by a system administrator (or manager) who, in theory, can be located virtually anywhere throughout the world. Expectedly, such database updating operations would be carried out using appropriate system access and security procedures well known in the art.

Inasmuch as the UPC data structure is presently employed as a universal product identifier (i.e. a primary data structure) in a majority of industries throughout the world, its twelve-digit numeric string (for UPC Version A) or eight-digit numeric string (for UPC Version E) will be a preferred UPN (in many applications) for purposes of carrying out the principles of the present invention. This twelve (12) digit human-readable number, printed on the bottom of each UPC label (and encoded within the bars and spaces of the UPC label itself), comprises: (i) a six digit manufacturer number assigned to the manufacturer by the Uniform Code Council, Inc. (UCC) of Dayton, Ohio, and consisting of a one digit "number system" number and a five digit manufacturer code; (ii) a five digit "product" number assigned to the product by the manufacturer; and (iii) a one digit modulo check digit (mathematically calculated) and added to each UPC number to check that the code has been read correctly by the bar code symbol reader.

In order to provide the requester greater control over what information is actually displayed on its Client System, the URL Information Field of the IPI Database shown in FIG. 4A1 contains a number of information subfields. As shown in FIG. 4A2, these information subfields comprise: a Product Advertisement Information Field for storing information representative of URLs pointing to information on the Internet relating to advertising and/or promotion of the product; a Product Specification (i.e. Description) Information Field for storing information representative of URLs pointing to information on the Internet relating to specifications on the product; a Product Update Information Field for storing information representative of URLs pointing to information on the Internet relating to product updates, recalls, notices, etc; a Product Distributor (e.g. Wholesaler and/or Resaler) Information Field for storing information representative of URLs pointing to information on the Internet relating to distribution, sale and/or ordering of the product; a Product Warranty/Servicing Information Field for storing information representative of URLs pointing to information on the Internet relating to warranty, extended warranty offerings, servicing and maintenance of the product; a Product Incentive Information Field (e.g. rebates, discounts and/or coupons) for storing information representative of URLs pointing to information on the Internet relating to rebates, discounts and sales on the product; a Product Review Information Field for storing information representative of URLs pointing to information on the Internet relating to reviews, analysis, testing, inspection and/or comparison of the product; and Miscellaneous Information Field(s) for storing information representative of URLs pointing to information on the Internet relating to miscellaneous aspects of the product (e.g., direct product sales on the WWW, product installation/set-up and operating manuals, company reports (10Ks, annual reports, etc.), and the like. Each URL symbolically linked to a UPC-labelled product registered in the Registered IPI Database is categorized within one or more of these URL categories.

The list of URLs recordable in the IPI Registrant Database for each registered UPC-labelled product is virtually unlimited. Below are just a few examples of how the IPI finding and serving subsystem hereof can be used as a virtual sales agent that provides value-added services to consumers, retailers and the like.

For each CD sound recording, the URL list may contain a URL that points to a promotional QuickTime® video recording or the like on the WWW for reviewing and evaluation by the consumer. The promotional song can be by a commissioned or endorsing artist, as is typically done in conventional advertising programs. The same can be done for video recordings on tape and digital video discs (DVDs). The URL may also provide the consumer with a down-loadable trial version of the product for a limited time period.

For each computer software product, the URL list may contain a URL that points to a multi-media clip on the WWW that provides a demonstration of the solutions that the software product provides, as well as the functions and development tools that it enables. It may also provide the consumer with a down-loadable version of the software product for a time-limited trial period.

For electronic consumer products, the URL list may contain a URL that points to a multi-media clip on the WWW that provides an audio-visual demonstration of the product in various user environments. Also, the URL can contain a URL that points to a Web-based Specification Sheet that can be printed out in a retail environment, at home, work or on the road.

For groceries and like articles, the URL list may contain a URL that points to a multi-media clip on the WWW that provides an QuickTime® video recording or the like of the product, illustrating various cooking recipes and uses to which the product can be put. Also, the URL can contain a URL that points to a Web-based Discount Coupon that can be printed out in the store, at home or work.

For toys, the URL list may contain a URL that points to a multi-media clip on the WWW that provides an audio-visual demonstration of the toy along with promotional endorsements by the various characters used in its advertising campaign.

For clothing, garments, or accessories (e.g. wearing apparel), the URL list may contain a URL that points to a multi-media clip on the WWW that provides an Quick-Time® video recording or the like of the clothing, garments, and/or accessories being modelled by stunning fashion models. Ideally, such video recordings, linked to particular articles of wearing apparel by their UPC number, can be used to extend and augment the advertising campaign being carried out in other forms of media (e.g. Television, radio, print, billboards, etc.).

Preferably, the manufacturer, its marketing personnel and advertising agents will actively participate in the creation of the product related information resources, as well as the placement of their URLs into the above-defined (or like) URL categories maintained within the Database of the IPI finding and serving subsystem hereof. Through such active participation, the business objectives of any particular manufacturers or retailer can be promoted by way of the IPI finding and serving subsystem of the present invention. In this way, the information requesting consumer is provided with only the kinds of product-related information which he or she seeks.

As shown in FIG. 4B, the Non-IPI Registrant Database maintained by each IPD Server comprises a plurality of labelled information fields for each product that is not currently registered with the IPD Server, namely: an IPSN (i.e. IPN) information Field for storing information (e.g. numeric or alphanumeric string) representative of the Universal Product Number (e.g. a UPC number from a UPC numbering system, or an EAN numbering system) assigned to the non-registered product; a Company Name Information Field for storing information (e.g. numeric or alphanumeric string) representative of the name of the company making, selling or distributing the corresponding non-registered product; a Trademark Information Field for storing information (e.g. text and/or alphanumeric strings) representative of each trademark used in connection the promotion, sale, distribution and/or use of the corresponding product, and preferably registered with the USPTO or other governmental agency; a Product Description Information Field for storing information (e.g. text strings) descriptive of the corresponding product; and an E-mail Address Information Field for storing information (e.g. numeric or alphanumeric string) representative of the e-mail address of the corresponding company (e.g. manufacturer) on the Internet; a Status Information Field for storing information (e.g. numeric or alphanumeric string) representative of whether the company associated non-registered product has been solicited by the IPD Server, and on what dates registration solicitation has occurred. Notably, each information item contained with the information field shown along the same horizontal line of FIG. 4A1 are related or linked. The information required to construct the Non-IPI Registrant Database shown in FIG. 4B can be readily obtained from a number of commercially or publicly available information sources (e.g., the Universal Code Council, Inc., Dayton, Ohio; Quickresponse Services, Inc. of Richmond, Calif.; General Electric Information Services (GEIS) of Delaware, Md.; etc.

Figure 5A:
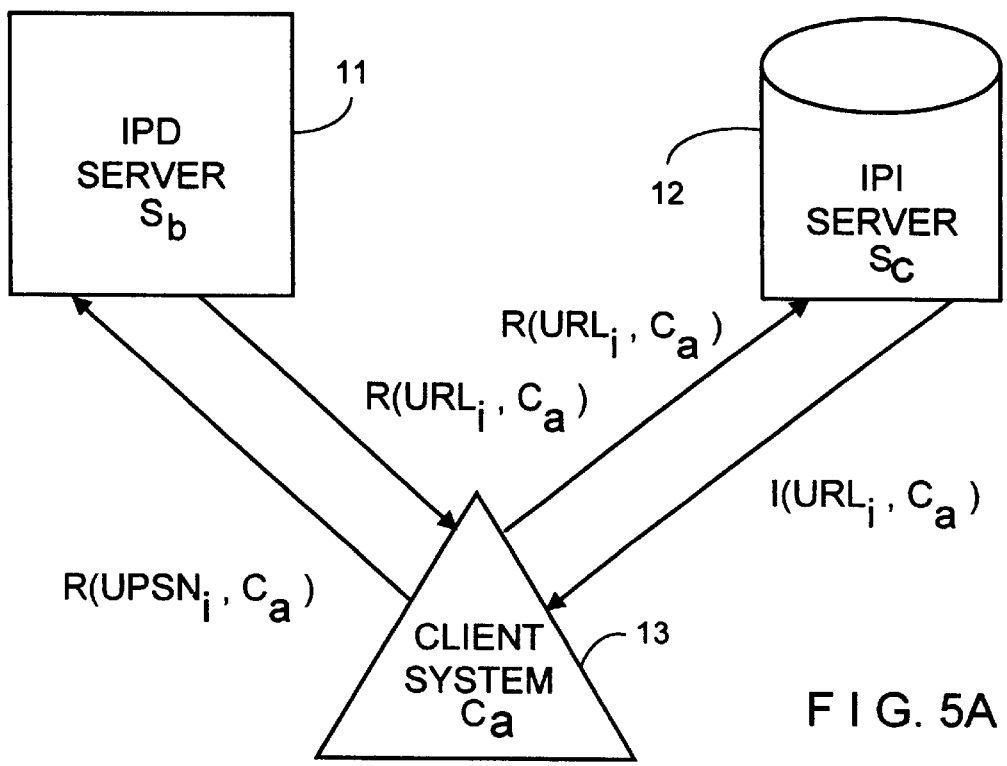
FIG. 5A is a schematic diagram illustrating the high level structure of a first type of communication protocol that can be used among the Client System $C_a$, the IPD Server $S_b$, and the IPI Server $S_c$ of the IPI finding and serving subsystem hereof when the GUI browser program running on the Client System is in its IPI Find Mode of operation, requesting as input a UPN (i.e. UPN data structure) to determine the URL(s) of the corresponding product registered therewith.
Figure 5B:
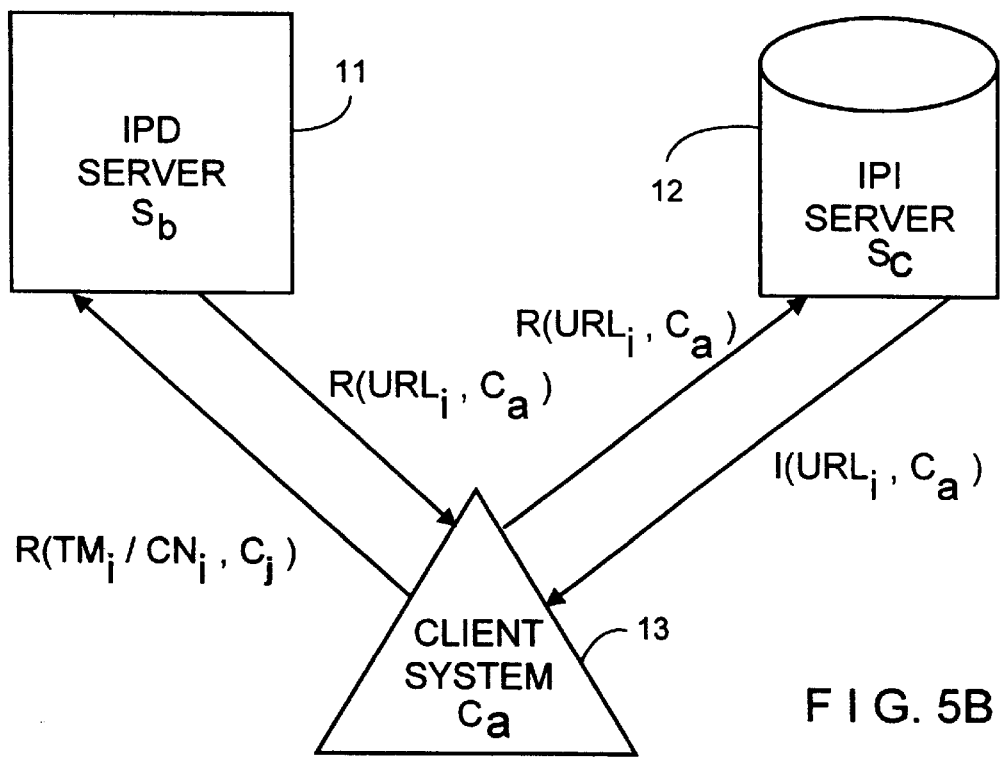
FIG. 5B is a schematic diagram illustrating the high level structure of a first type of communication protocol that can be used among the Client System $C_a$, the IPD Server $S_b$, and the IPI Server $S_c$ of the IPI finding and serving subsystem hereof when the GUI browser program on the Client System is in its UPN Search Mode of operation, requesting as input a trademark and/or company name in order to determine the UPN (i.e. UPN data structure) of the corresponding product and thus the URL(s) registered therewith.
Figure 6A:
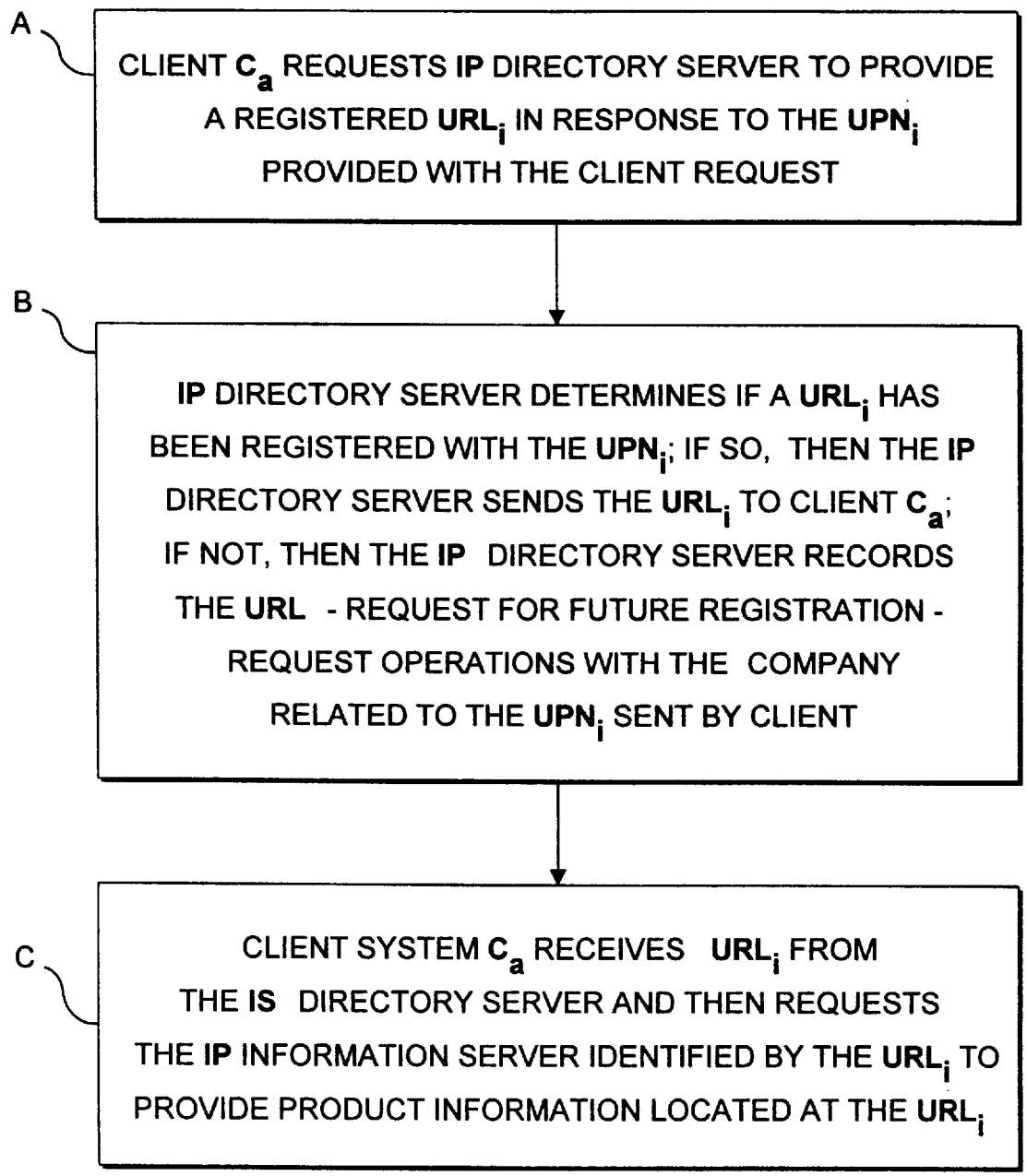
FIG. 6A is a high level flow chart illustrating the steps involved in carrying out the communication protocol shown in FIG. 5A when the Client System is in its IPI Find Mode of operation.
Figure 6B:
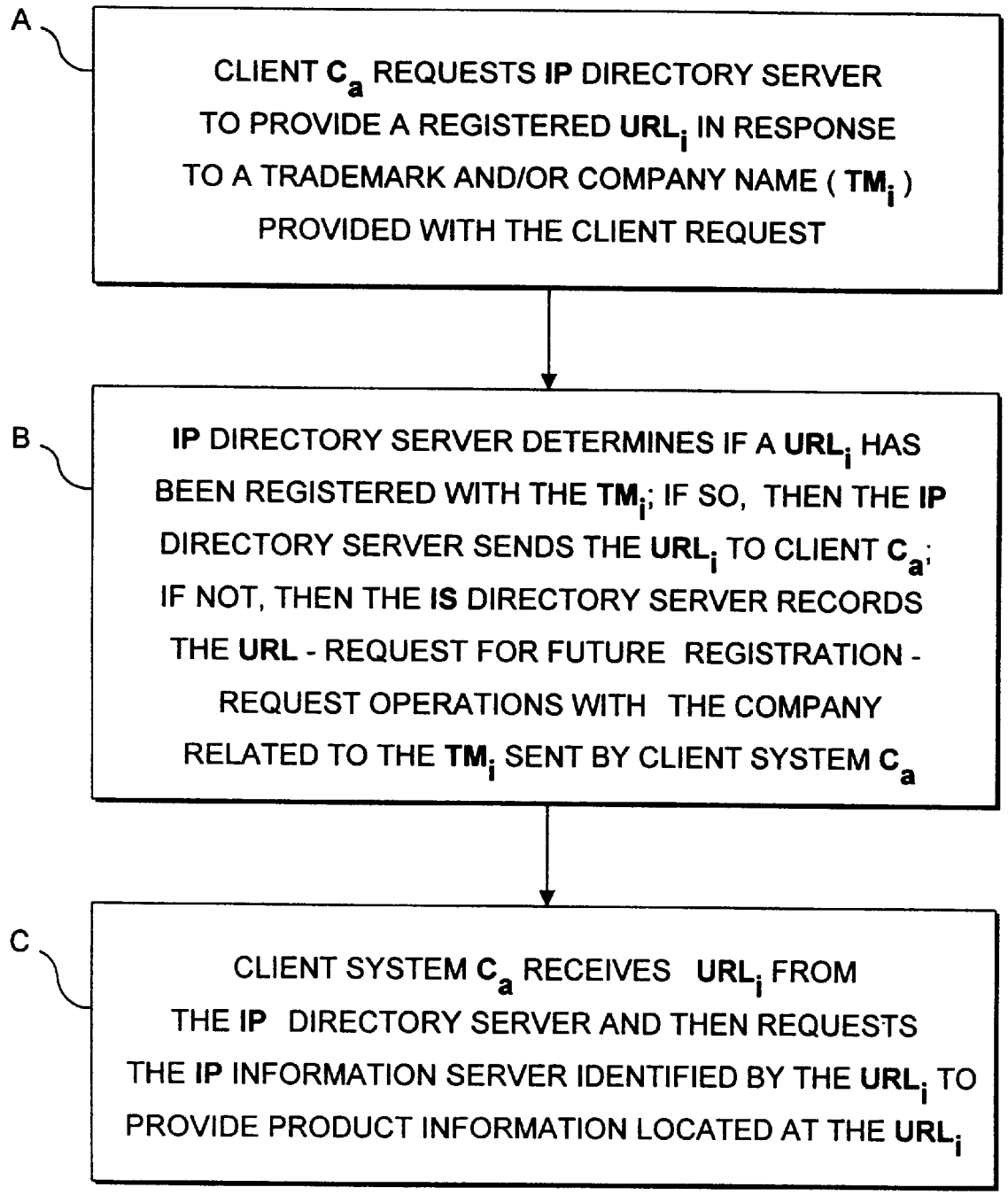
FIG. 6B is a high level flow chart illustrating the steps involved in carrying out the communication protocol shown in FIG. 5A when the Client System is in its UPN Search mode of operation.
Figure 7A:
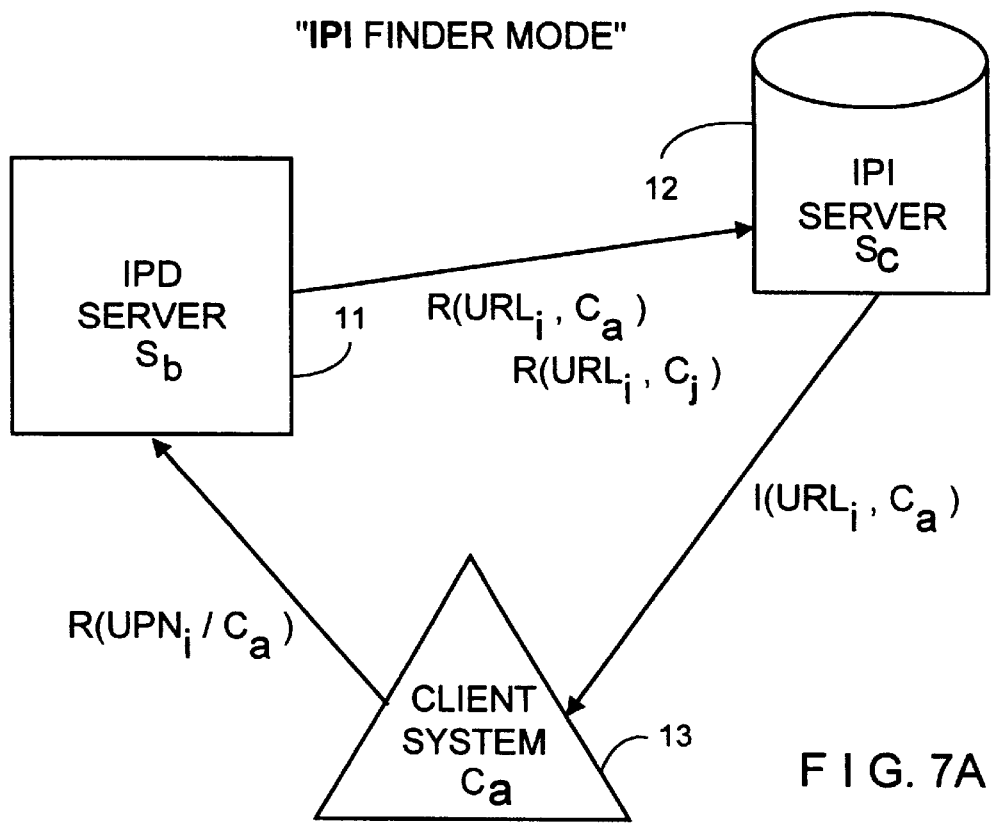
FIG. 7A is a schematic diagram illustrating the high level structure of a second type of communication protocol that can be used among the Client System $C_a$, the IPD Server $S_b$, and the IPI Server $S_c$ of the IPI finding and serving subsystem hereof when the GUI browser program on the Client System is in its IPI Find Mode of operation, requiring as input a UPN to determine the URL(s) of the corresponding product registered therewith.
Figure 7B:
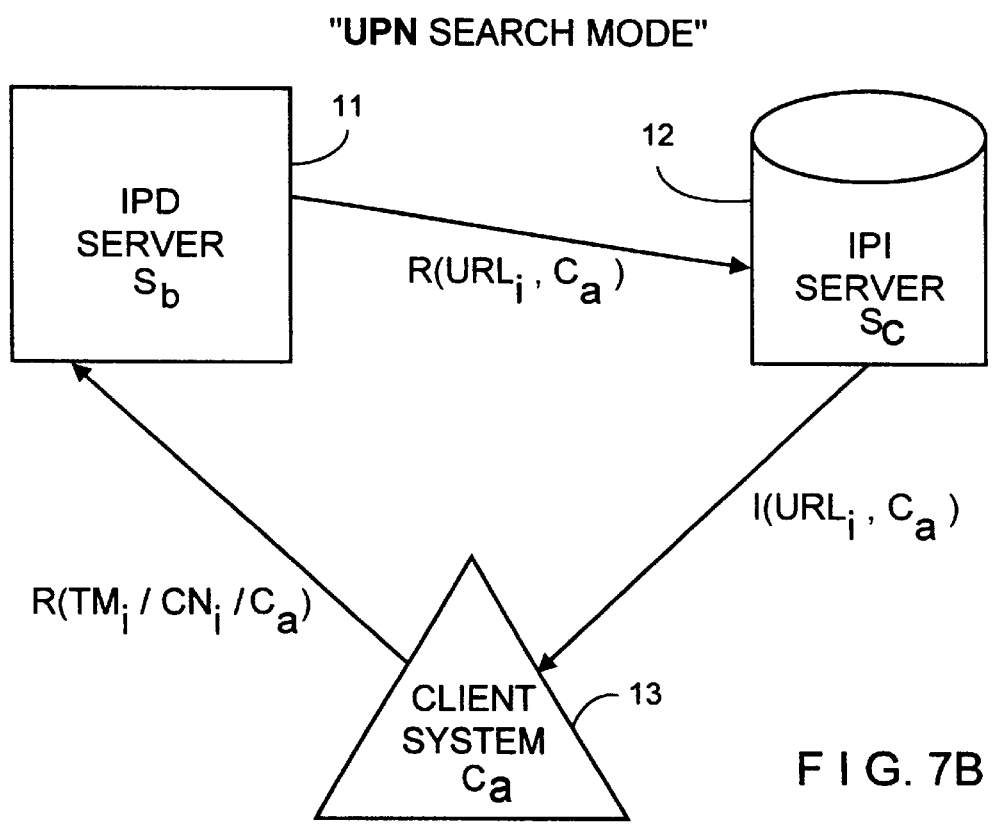
FIG. 7B is a schematic diagram illustrating the high level structure of a second type of communication protocol that can be used among the Client System $C_a$, the IPD Server $S_b$, and the IPI Server $S_c$ of the IPI finding and serving subsystem hereof when the GUI browser program on the Client System is in its UPN Search Mode of operation, requiring as input a trademark and/or company name in order to determine the UPN of the corresponding product and thus the URL(s) registered therewith.
Figure 8B:
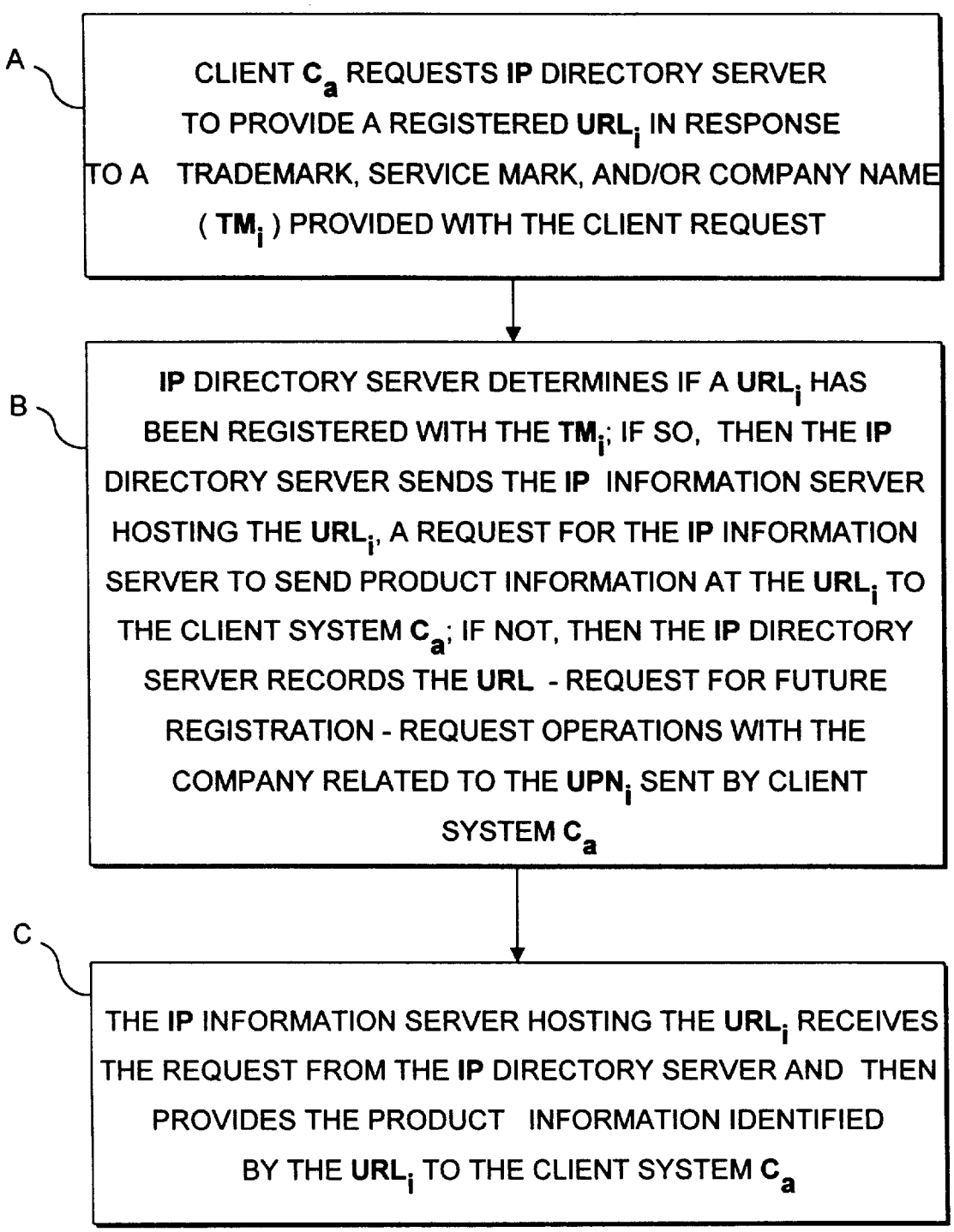
FIG. 8B is a high level flow chart illustrating the steps involved in carrying out the communication protocol shown in FIG. 7A when the Client System is in its UPN Search Mode of operation.

Communication Protocols For Carrying Out The IPI Finding and Serving Subsystem And Method Of The Present Invention In general, there are a number of possible communication protocols that can be used to carry out the IPI Subsystem and method of the present invention. In FIGS. 5A and 5B, a first communication protocol is schematically depicted for a first system having both the IPI Find and UPN Search Modes of operation, whereas the basic operations carried out thereby are shown in FIGS. 6A and 6B. In FIGS. 7A and 7B, a second communication protocol is schematically depicted for both the IPI Find and UPN Search Modes of operation, whereas the basic operations carried out thereby are shown in FIGS. 8A and 8B. The details of such protocols will be described below.

Referring to FIG. 5A, the high level structure is shown for a first-type of communication protocol that can be used among a Client System $C_a$, an IPD Server $S_b$, and an IPI Server $S_c$ of the IPI finding and serving subsystem hereof when the GUI browser program on the Client System is in its IPI Find Mode of operation. FIG. 6A provides a high level flow chart illustrating the steps involved in carrying out this communication protocol when the Client System is in its IPI Find Mode of operation.

In order to enter the IPI Find mode of the system, the user selects the "IPI Find" Button 21A on the control strip 21 of the framed Internet browser screen. Then at Block A of FIG. 6A, a UPN (e.g. UPC number) is provided as input to IPD Server $S_b$, and in response thereto the Client System $C_a$ requests the IPD Server $S_b$ to provide each registered $URL_i$ stored in the IPI Registrant Database.

At Block B in FIG. 6A, the IPD Server $S_b$ analyses the IPI Registrant Database shown in FIG. 4A1 to determine whether or not a symbolically linked $URL_i$ has been registered with $UPN_i$ that has been provided as input. If so, then the IPD Server sends the symbolically linked $URL_i$ to the Client System $C_a$. If not, then the IPD records in the URL-request in the Non-IPI Registrant Database shown in FIG. 4B.

At Block C in FIG. 6A, the Client System $C_a$ receives the $URL_i$ from the IPD Server. Then, in response to a URL selection query based on the content of information subfields shown in FIG. 4A2 and displayed on the screen of the Client System $C_a$, the Client System $C_a$ requests the IPI Server, identified by the user selected $URL_i$, to provide the product information located by the registered $URL_i$. Having accessed and displayed such product related information at the Client System, the user can review the information at the specified $URL_i$, acquire knowledge about the product, and may, if the option is provided at the URL-specified Web-site, purchase the product by way of an on-screen electronic commercial transaction. Such commercial transaction can involve product ordering, delivery specification, and financing through the use of credit or debit card transactions, COD arrangements, or any other financial arrangement acceptable to the vendor of the product.

Referring to FIG. 5B, the high level structure is shown for the first-type of communication protocol that can be used among a Client System $C_a$, an IPD Server $S_b$, and an IPI Server $S_c$ of the IPI finding and serving subsystem hereof when the GUI browser program on the Client System is in its UPN Search Mode of operation. FIG. 6B provides a high level flow chart illustrating the steps involved in carrying out this communication protocol when the Client System is in its UPN Search Mode of operation.

In order to enter the UPN Search Mode of the system, the user selects the "UPN Search" Button 21B on the control strip 21 of the framed Internet browser display screen. Then at Block A of FIG. 6B, a trademark $TM_i$ and/or a company name $CN_i$ is provided as input to IPD Server $S_b$ by way of the browser display screen. Then in response thereto, the Client System $C_a$ requests the IPD Server $S_b$ to provide each registered $UPN_i$ stored in the IPI Registrant Database, and if so, then also its $URL_i$ to the Client Computer System.

At Block B in FIG. 6A, the IPD Server $S_b$ analyses the IPI Registrant Database shown in FIG. 4A1 to determine whether or not a symbolically linked $UPN_i$ has been registered with a $TM_i$ and/or a company name $CN_i$ that has been provided as input to the IPD Server $S_b$ by way of the browser display screen. If so, then the IPD Server sends to the Client System $C_a$, the $URL_i$ that is symbolically linked to the registered $UPN_i$. If not, then the IPD records in the URL-request in the Non-IPI Registrant Database shown in FIG. 4B for future registration-request operations related to the $TM_i$ sent by the Client System.

At Block C in FIG. 6B, the Client System $C_a$ receives the $URL_i$ from the IPD Server, Then, in response to a URL selection query based on the contents of the information subfields shown in FIG. 4A2 and displayed on the screen of the Client System $C_a$ the Client System requests the IPI Server, identified by the user selected $URL_i$, to provide the product information. Having accessed and displayed such product related information at the Client System, the user can review the information at the specified $URL_i$, acquire knowledge about the product, and may, if the option is provided at the URL-specified Web-site, purchase the product by way of an on-screen electronic commercial transaction, as described hereinabove.

Referring to FIG. 7A, the high level structure is shown for a second, alternative type of communication protocol that may be used among a Client System $C_a$ an IPD Server $S_b$, and an IPI Server $S_c$ of the IPI finding and serving subsystem hereof when the GUI browser program on the Client System is in its IPI Find Mode of operation. FIG. 8A provides a high level flow chart illustrating the steps involved in carrying out this communication protocol when the Client System is in its IPI Find Mode of operation.

In order to enter the IPI Find mode of the system, the user selects the "IPI Find" Button 21A on the control strip 21 of the browser display screen. Then at Block A of FIG. 8A, a UPN is provided as input to IPD Server $S_b$, and in response thereto the Client System $C_a$ requests the IPD Server $S_b$ to provide each registered $URL_i$ stored in the IPI Registrant Database.

At Block B in FIG. 8A, the IPD Server $S_b$ analyses the IPI Registrant Database shown in FIG. 4A1 to determine whether or not a symbolically linked $URL_i$ has been registered with $UPN_i$ that has been provided as input. If so, then in response to a URL selection query based on the contents of the information subfields shown in FIG. 4A2 and displayed on the screen of the Client System $C_a$, the IPD Server sends to the IPI Server $S_b$ hosting the user-selected $URL_i$, a request for the IPI Server $S_c$ to send product information at the selected $URL_i$ to the requesting Client System $C_a$. If the IPD Server $S_b$ determines that there does not exist a $URL_i$, in the IPI Registrant Database symbolically linked with the $UPN_i$ provided as input to the Client System $C_a$ then the IPD Server $S_b$ records the URL-request in the Non-IPI Registrant Database for future registration operations with the company related to the input $UPN_i$.

At Block C in FIG. 8A, the IPI Server $S_c$ receives the user-selected $URL_i$, sent from the IPD Server $S_b$ and then provides to the Client System $C_a$ the product information located by the registered $URL_i$. Having accessed and displayed such product related information at the Client System, the user can review the information at the selected $URL_i$, acquire knowledge about the product, and may, if the option is provided at the URL-specified Web-site, purchase the product by way of an on-screen electronic commercial transaction.

Referring to FIG. 7B, the high level structure is shown for the second-type of communication protocol that can be used among a Client System $C_a$, an IPD Server $S_b$, and an IPI Server $S_c$ of the IPI finding and serving subsystem hereof when the GUI browser program on the Client System is in its UPN Search Mode of operation. FIG. 8B provides a high level flow chart illustrating the steps involved in carrying out this communication protocol when the Client System is in its UPN Search Mode of operation.

In order to enter the UPN Search Mode of the system, the user selects the "UPN Search" Button 21B on the control strip of the browser display screen. Then at Block A of FIG. 8B, a trademark $TM_i$ and/or a company name $CN_i$ is provided as input to IPD Server $S_b$ by way of a dialogue box displayed on the browser display screen. In response thereto, the Client System $C_a$ requests the IPD Server $S_b$ to determine whether or not a registered $UPN_i$ (and thus symbolically linked $URL_i$) is stored in the IPI Registrant Database. If so, then in response to a URL-selection query based on the content of the information subfields shown in FIG. 4A2 and displayed on the display screen of the Client System $C_a$, the IPD Server $S_b$ sends the IPI Server $S_c$ hosting the user-selected $URL_i$, a request for the IPI Server $S_c$ to send product information at the selected $URL_i$ to the requesting Client System $C_a$. If the IPD Server $S_b$ determines that there is no registered UPNI (and thus no symbolically linked $URL_i$) stored in the IPI Registrant Database, then the IPD Server records the URL request in the Non-IPI Registrant Database for future registration operations with the company related by the $UPN_i$ sent by the Client System $C_a$.

At Block C in FIG. 8B, the IPI Server hosting the user-selected $URL_i$ receives the request from the IPD Server $S_b$ and then provides the product information identified by the registered $URL_i$. Having accessed and displayed such product related information at the Client System, the user can review the information at the specified $URL_i$, acquire knowledge about the product, and may, if the option is provided at the URL-specified Web-site, purchase the product by way of an on-screen electronic commercial transaction.

The communication protocols described above can be realized using any suitable programming language including, for example, an object-oriented programming language such as the Java™ programming language.

Registering Consumer Products With The IPI Finding and Serving Subsystem

The utility of the product finding functionalities of the system of the present invention depends in large part of the number of consumer-products registered with the IPI Finding and Serving Subsystem thereof. In principle, numerous techniques may be employed separately and in combination with each other in order to construct the IPI and Non-IPI Registrant Databases supported by the IPD Servers of the present invention. Five such tecnhiques will be detailed below.

According to a first database construction technique, the administrator of the IPI Registrant Database would transmit Product Registration Requests (PRRs) in the form of electronic documents to each and every the manufacturer having been issued, for example, a six digit UPC Manufacturer Identification Number (MIN) by the UCC, Inc. Such electronic documents can be transmitted using conventional MIME protocols such as, for example, STMP. The Product Registration Request document would seek to ascertain from the manufacturers the various information items (including the menu of URLs) identified in the IPI Registrant Database of FIG. 4A1. In response to the Product Registration Request, each solicited manufacturer would send back to the administrator of the IPI Registrant Database (for each of its consumer products) its UPC number and a menu of URLs indicating the location of the information resources identified in the Product Registration Request document. This information can then be used to readily construct the IPI Registrant Database of the illustrative embodiment.

According to a second database construction technique, a global advertising campaign would be launched (over various media) in order to solicit the various information elements identified in the IPI Registrant Database of FIG. 4A1 and thus register the products of the manufacturers selling UPC-labelled products. Preferably, such information would be collected by way of an electronic document transfer subsystem set-up to cooperate with the system of the present invention in order to facilitate database construction operations.

According to a third database construction technique, the IPI system itself would continuously solicit consumer product registrations over time in order to collect information from companies responding favorably to the solicitations. While such solicitation efforts can involve the issuance of product registration requests using various types of media, it is preferred that the information collection operations are carried out using electronic document transfer techniques described hereinabove.

According to a fourth database construction technique, a number of commercial on-line Internet search engines, such as Altavista™, Yahoo™, WebCrawler™, Lycos™, Excite™, as well as powerful off-line parallel-processing processing search engines, would be enlisted to analyze (i.e. mine) information on the World Wide Web in order to collect and link the information elements specified in the IPI Registrant Database of FIG. 4A1.

Once an "initial" IPI Registrant Database has been constructed using any one or more of the four database construction techniques described hereinabove, manufacturers registered therewith can be periodically contacted using Web-based electronic document (i.e. message) transfer techniques in order to request updating and confirmation of the UPC/URL listings contained within the database of the IPI subsystem of the present invention.

According to a fifth database and preferred construction technique of the present invention, the Registrant IPI Database of the system would be initially "seeded" with several items of information obtained and related without the assistance of manufacturers of UPC-labelled products. Such information items include: (1) the six digit UPC Manufacturer Identification Numbers encoded in the UPC symbols (and numbers) applied to the products of such UCC-registered manufacturers; and (2) the URLs of the Web home pages of such manufacturers.

The first step of this database construction method involves obtaining the six digit Manufacturer Identification Numbers (MINs) uniquely issued to manufacturers by the Uniform Code Council, Inc. of Dayton, Ohio. Such MINs can be obtained from various commercial sources including GE Information Services, QuickResponse Services, Inc., as well as the UCC. At present, about 180,000 Manufacturers Identification Numbers have been issued to manufacturers by the UCC. A string of six zeros (i.e. 000000) may be added to each one of these 180,000 or so six digit Manufacturer Identification Numbers in order to produce 180,000 or so 12 digit numbers (i.e. hereinafter referred to as "Manufacturer's Reference Numbers) for the 180,000 or so manufacturers listed in the IPI Registrant Database under construction. As each such Manufacturer Reference Number has the same length as a UPC number of its manufacturer, this number can be conveniently thought of as the "Manufacturer Reference UPC Number" which can be stored in the UPN Information Field of the Database along with the corresponding manufacturers name being stored in the Company Name Information Field.

The second step of the method involves finding the URL of the Web home page of each of the 180,000 manufacturers who have been assigned a Manufacturers Identification Code and are listed in the Database. Such URL information can be found using a number of available techniques: (i) using a commercially available search engine to search the WWW in order to find the URL of the home page of each manufacturer's Web-site, if it has one, using the name and address thereof obtained during the first step above; or (ii) using a commercially available (INTERNIC-enabled) Domain Name search service that uses the names and addresses of the manufacturers (obtained during the first step above) in order to determine whether a particular manufacturer has a registered domain name on the Internet, and if so, is the domain name being actively used in a URL that points to the home page of the manufacturer's Web-site. Once obtained, such URLs are then added to the IPI Database, along with the e-mail and/or other address of the manufacturer symbolically linked thereto (if available).

Having constructed the "seeded" Database, it can then be used to connect the Client System of users to the home page of Web-sites of manufacturers of particular products. Initially, when an Internet user provides the UPC number of a particular product as input to the UPC Number Entry Window 21D of the Control Strip of the Client System (operated in its UPN Search Mode), then the IPD Server needs only compare the first six digits of the entered UPC number against the first six-digits of the Manufacturer Reference UPC Numbers (i.e. Manufacture Identification Numbers) listed in the "seeded" Database. The corresponding (home-page) URL of the matching manufacturer is returned to the Client System $C_a$ for display. In the instance of an initially seeded Database, in which only the "Manufacturer Reference UPC Numbers" are listed therein, the requesting Client Systems are provided with the URLs of the home pages of the symbolically linked manufacturers. Then as manufacturers begin to register their consumer products with the system (e.g. in response to mass e-mailings, advertisements and/or marketing and promotional efforts, etc.), the IPD Database will return a menu of "hot-linked" URLs, for each registered product, pointing to various types of product-related information resources on the Internet (described above) that can be easily accessed by simply clicking thereon in a conventional manner. Over time, Manufacturer Reference UPC Numbers and the URLs of the "home pages" of such manufacturers will become replaced by the UPC numbers of registered products and the menu of URLs on the WWW symbolically linked thereto by the manufacturers, thereby allowing consumers and users of the system to precisely pinpoint consumer product-related information on the WWW which has been specified by the manufacturer, its marketing department and/or advertising agency. With manufacturer's and advertiser's participation and feedback, the initially seeded Database described hereinabove will quickly grow into a robust relational database richly filled with the various information items described in FIGS. 4A1 and 4A2, including the symbolically linked UPCs and URLs that point to very specific consumer product related information resources (i.e. files) stored within IPI Servers of the system located across the global expanse of the Internet.

Registration Solicitation Mode Of The IPI Finding and Serving Subsystem

In the illustrative embodiments of the present invention, the data-synchronized IPD Servers of the system hereof are also provided with an "Automated Registration Solicitation Mode" programmed by the webmaster (or administrator) of the IPI Web-site. In this mode, each IPD Server analyzes the data collected within its Non-IPI Registrant Database. The data analysis procedure seeks to determine: (1) which "unregistered"products in the Non-IPI Registrant Database were the subject of an information request at the IPD Server; (2) how many hits (requests) where made for the product within a predetermined length of time (e.g. one week) by Internet users; and (3) whether the number of requests exceeds a particular "request threshold" (e.g. 100 requests in week period). Then for each unregistered product which has exceeded the request threshold, the IPD Server automatically sends an E-mail message to the associated company. Preferably, the E-mail message is designed to (i) inform the company of recent information requests for their products, and (ii) solicit the registration of such products with the IPD Server. Once registered with the system, such products can be easy found on the Internet by anyone wishing to use the product information finding techniques of the present invention.

The Product Registration Mode Of The IPI Finding and Serving Subsystem

In the illustrative embodiments of the present invention, the IPI finding and serving subsystem of the present invention is also provided with an "Product Registration Mode" that can be activated by simply selecting the Product Registration Button 21C on the control panel 21 of the framed Internet browser of any Client System 13. In general, there are a number of different ways of carrying out the Product Registration Mode of the subsystem. Each of these techniques will be described below.

The first method illustrated in FIGS. 2A1 and 2A2 involves by carrying out FTP between a Client System of the registering manufacturer (or its agent) $M_i$ and an IPD Server in order to update the IPI Registrant Database associated therewith. This can be carried out by the manufacturer's officer or agent surfing to the IPI Website, selecting the "Product Registration Mode" from the control strip, and then following the instructions displayed on the various screens of the Website in this mode. When using the first method, product UPCs, URLs and other information elements can be formatted within suitable Product Registration Forms and transmitted by FTP from the Client System or Database Server of a registering manufacturer to the IPD Server 11 so that the IPI Registrant Database thereof can be updated accordingly. The first method will be desirable typically when registering a few consumer-products.

The second method illustrated in FIG. 2B, involves first carrying out EDI between a Client System of the registering manufacturer (or its agent) and the UPC/URL Database Subsystem 9, and then carrying out FTP or SMTP between the Client System and an IPD Server in order to update the IPI Registrant Database maintained therein. The second method will be desirable when a manufacturer needs or desires to register a large number of consumer-products. The details of these information transmission methods will be described below.

When using the second method, conventional EDI protocols can be used to transmit product UPCs, URLs and other information elements from Client Systems or Database Servers of manufacturers to the UPC/URL Database Subsystem 9 of the present invention. FTP can be used to transmit UPCs and URLs from the UPC/URL Database Subsystem to each IPD Server in the system so that the IPI Registrant Database thereof can be updated accordingly. Once registered with the system using either of these methods in the Product Registration Mode, such consumer-products can be easy found on the Internet by anyone wishing to use the product finding techniques of the present invention.

The third method involves carrying out electronic document interchange over the Internet between the WebDox Remote™ Computer System 13 and the WebDox™ Server 30 of the system of the present invention, and communication between the WebDox™ Server 30 and the WebDox™ Admin computer system 31 of the system hereof. The various steps involved in this embodiment of the consumer product registration process will be described in detail below.

When the manufacturer selects the "Product Registration Mode" of the system, WebDox Remote™ software, customized to the UPC/URL-Menu requirements of the system, is automatically downloaded from the WebDOX™ Server 30 to the manufacturer's client computer system (i.e. the WebDox Remote™ Computer System) 13. At the end of the software installation process on the Manufacturer's client computer system, a Manufacturer Registration Form is presented and the manufacturer enters some identification information and presses the "Send" button on the Manufacturer Registration Form. The form is then transmitted immediately via the Internet and received by the WebDOX™ Server 30. At the WebDox™ Server 30, an automated process takes the information in the Manufacturer Registration Form and registers the Manufacturer.

When the WebDox Remote™ Computer System 13 (of a particular manufacturer) receives the UPC/URL Registration Application (program) from the WebDOX™ Server 30, it automatically installs it and an Activation Form is displayed. After selecting the "UPC/URL Registration" document(s) for use by the manufacturer, the manufacturer then presses the "Send"button on the Activation Form. The Activation Form is received by the WebDox Server and the WebDox Admin. System is updated. This tells WebDox Server that it will be exchanging the "UPC/URL Registration"documents with the manufacturer. The Manufacturer is now registered with the system, and ready for UPC/URL Registration document exchange.

The WebDox Remote™ computer system 13 available to each manufacturer has both online and offline modes of operation. In the offline mode, the manufacturer prepares, in response to a UPC/URL Registration Request from the WebDox™ Server, a UPC/URL Registration Response document that contains a set of currently active URLs specifying the address location of Web-based information resources associated with each UPC-encoded product of the manufacturer, and then establishes an Internet connection with the WebDox™ Server from the WebDox Remote program, through a "Get/Send Mail" option. This delivers the UPC/URL Registration Response (message) to the WebDox™ Server 30 and retrieves any documents which are waiting thereat for the manufacturer. These new documents are listed by WebDox Remote™ program and presented in the InBasket of the manufacturer's WebDox Remote™ computer system 13.

In the online mode, WebDox Remote™ (under the control of the Form Application) can also send UPC/URL Registration Request documents immediately. For very sensitive applications (i.e. Just-in-Time), this ensures that the UPC/URL Registration Response document is received at the WebDox™ Server 30 the moment that the manufacturer completes the document, provided that the UPC/URLs are prelisted and accessible to the WebDox Remote™ program.

In general, the WebDox™ Server 30 provides a high-volume document processing and mailboxing environment between the WebDox Server and the WebDox Remote™ system of each registered manufacturer. WebDoX™ Server 30 performs: permanent storage and tracking of all UPC/URL Registration Request documents sent and UPC/URL Registration Response documents received; automatic reconciliation of acknowledgments from WebDox Remote™ program; Automatic creation of user-friendly receipt messages to the manufacturer; "mailboxing" of outbound UPC/URL Registration documents for retrieval by manufacturer; and automatic manufacturer and profile creation based on forms received from manufacturers. The WebDox™ Server 30 consists of online components that run as extensions to Microsoft's Internet Information Server (IIS) using the ISAPI interface. This provides higher performance and lower hardware requirements than a conventional CGI Web Interface. Processing intensive tasks are performed asynchronously from the Web server. An integrated queuing and dispatching system manages the processing of documents and interaction with the corresponding application. For large volume situations, the WebDox™ Server components can be deployed on different machines, the WebDox™ Server components (ISAPI extensions) on one machine, the processing components and database on another machine.

Data for UPC/URL Registration Request documents to be sent to manufacturers is extracted from the IPI Registrant Database using an interface or utility program. The document data (e.g. Information fields associated with UPC/URL registration) can then be accepted by WebDox in a direct manner after formatting. The UPCIURL Registration Request document should be formatted to a file structure created during the design of the UPC/URL Registration Application. WebDox™ Server then converts the application data into a UPCIURL Registration request document (i.e. data package) for that particular Application. The data package for each manufacturer is then stored (as a message) in an assigned Mailbox of the WebDox™ Server 30. These messages are then available to be retrieved by the registered manufacturers using WebDox Remote's™ "Get/Send Mail" feature.

WebDox Remote™ system transmits messages (e.g. UPC/UR: Registration Response documents) to the Web-Dox™ Server 30, where, after passing security checks, they are placed in the WebDox Mailbox system. Incoming (document) messages are received from the Mailbox, processed, and converted into data files for direct transfer to the database management system handling the IPI Registrant Database.

For each document received, the WebDox™ Server 30 will return a message to the manufacturer confirming receipt of the document. WebDox Remote™ system also returns delivery confirmations to the WebDox Server. These messages are used by the WebDox™ Server to track the status of messages. WebDox™ Server 30 maintains Mailbox Files for all inbound and outbound messages. The status of messages is updated on an ongoing basis as acknowledgement that messages are received, allowing timely and precise audits.

WebDox Admin™ Computer system 31 provides an easy-to-use tool to manage the community of manufacturers, review the status of documents, and configure the Web-Dox™ Server 30, including: ad hoc maintenance of manufacturer information; online display of the Mailbox permitting inquiry into document status or document activity for particular manufacturers, and the ability to reset document status; creation and maintenance of UPC/URL Registration Profiles; preparation of "releases" of new and updated UPC/URL Registration Applications; Distribution of new and updated UPC/URL Registration Applications; and automatic inventory and tracking of UPC/URL Registration Applications distributed to manufacturers.

In the preferred embodiment, UPC/URL Registration Application design and development is carried out on a Windows 95 or NT workstation. The UPC/URL Registration Application is developed, tested, and then fully implemented for production with manufacturers. New or updated UPC/URL Registration Applications are registered with the WebDox Admin™ computer system 31 and are then distributed to the manufacturers as described herein above.

In the preferred embodiment, UPC/URL Registration Applications are developed using Microsoft Visual Basic™ and related software tools. These products provide rapid design and creation of the screen-based forms that the manufacturer uses. In addition, the "intelligence" behind the form, in the UPC/URL Registration Application, can be very powerful, making the manufacturer's work easier while ensuring that the user and Server application receive high quality data.

The WebDox Admin™ system handles the distribution of UPC/URL Registration Applications to manufacturers. New UPC/URL Registration Applications can be sent to some or all of the existing manufacturers assigned UPC Manufacturer Identification Numbers. Updates to UPC/URL Registration Applications can be sent to manufacturers who are currently using that UPC/URL Application. The actual update is distributed by sending a small notification message to each manufacturer, which then results in the remote site downloading the new forms from the WebDox™ Server 30, as hereinbefore described above.

Operation of the IPI Finding and Serving Subsystem and Method Hereof

In the above-described embodiments of the system hereof, each Client System is provided with two independent modes of operation relating to "information access", namely: the "IPI Find Mode" and the "UPN Search Mode".

When the "IPI Find" button is selected from the control panel 21 displayed in frame 21B, the system (i.e. the Internet browser program) enters its the IPI Find Mode. Preferably, the user is provided with a choice of language (e.g. English, German, French, Japanese, Chinese, etc.) by way of an appropriate menu-selection screen. After the desired language selection is made, the home page is displayed upon the Client System's display screen. A typical display screen produced from the IPD Server might read as follows:

"Welcome to UPC-REQUEST™, the only Universal Product-Information Finding and Serving System on the Internet.

Have you purchased a particular product, or considering the purchase of a particular product, on which you would like current, up-to-date information from the manufacturer or advertiser?

Look no further than the UPC-REQUEST™ Universal Product-Information Finding and Serving System."

When the system is in its IPI Find Mode, as illustrated in FIGS. 5A, 6A and 7A,8A, a Web-based information resource pertaining to any commercial product registered with the system can be displayed and selected by the user in order to automatically access the same from the Internet. Such information resources can include advertisements, specifications, operation descriptions, product simulations, purchase information, maintenance information, warranty and servicing information, product updates, distributor/reseller information, incentives (e.g. discounts, rebates, coupons, etc.), electronic data transaction screens, etc. In this mode, desired product information is obtained by simply entering the registered product's UPN (e.g. its UPC's 12 digit numerical string) into the dialogue box of the Internet browser or Internet communication tool. Such data entry can be carried out manually using a keyboard data entry techniques, or automatically using an bar code symbol reader connected to the Client System as discussed in detail above. When using the seeded IPI Database described hereinabove, only the first six digits of the UPC number need be entered into the dialogue box. An exemplary display screen produced from the IPD Server might be as follows:

"Simply enter the 12 digit UPC the particular product; click REQUEST, and then wait for the display of the list of Web locators (URLs) at which the desired product information can be found on the Internet?"

In response to such data entry operations, a list or menu of URLs organized according to information subfield classifications as set forth, for example, in FIG. 4A2, are displayed on Client System $C_a$ making the request of the IPD Server. At this stage, another display screen would appear with an exemplary message as follows:

"Please select the URL from the displayed URL Menu using the information subfield product information category displayed above. This will connect you to the product information related to the selected URL. You can return to the URL display list at anytime."

Upon selecting a particular URL from the displayed URL menu, video and audio information content are automatically served from the IPI Server hosting the selected URL and thereafter displayed on the Client System.

When the "UPN Search" button is selected, the system enters its UPN Search Mode". Preferably, the user is provided with a choice of language (e.g. English, German, French, Japanese, Chinese, etc.) by way of an appropriate menu-selection screen.

When the system is in its UPN Search Mode, as illustrated in FIGS. 5B, 6B and 7B, 8B, a predesignated information resource pertaining to any commercial product registered with the system can be automatically accessed from the Internet and displayed from the Internet browser of a Client System. Such information resources can include advertisements, specifications, operation descriptions, product simulations, product upgrade information, purchase information, maintenance information, warranty and servicing information, etc. In this mode, desired product information is obtained by simply entering the registered product's trademark(s) and/or associated company name into the dialogue box of the Internet browser or Internet communication tool. An exemplary display screen produced from the IPD Server might be as follows:

"Simply enter the trademark used in connection with the particular product and/or the company name of the product's manufacturer; click REQUEST, and then wait for the display of a list of Web locators (URLs) at which desired types of product information can be found on the Internet?"

In response to such data entry operations, a list of URLs organized according to the information subfield classifications set forth in FIG. 4A2 are displayed on Client System placing the request. Upon selecting a particular URL from the displayed list thereof, video and audio information content are automatically served from the IPI Server hosting the selected URL and thereafter displayed on the Client System.

In an alternative embodiment of the present invention, the "IPI Find Mode" and the "UPN Search Mode" can be integrated into a single server application so that there is no need or desire to manually select IPI Find and UPN Search Mode buttons 21A and 21B, respectively. In such an embodiment, the interaction between the IPD Server and the requesting Client System can be designed to support the following Web server display screens and script underlying the same:

"Welcome to UPC-REQUEST™, the only Universal Product-Information Finding and Serving System on the Internet.

Have you purchased a particular product, or considering the purchase of a particular product, on which you would like current, up-to-date information from the manufacturer or advertiser?

Look no further than the UPC-REQUEST™ Universal Product Information Finding and Serving System."

"Simply enter the 12 digit UPC number of the particular product, click REQUEST, and select from the displayed menu of Web locators (URLs) to find the desired product information on the WWW.

"If you do not know the UPC number associated with the product you are looking for, then simply enter the trademark used in connection with the particular product and/or the company name of the manufacturer, then click REQUEST, and wait for the display of the list of Web locators (URLs) at which the desired product information can be found?

"Please select the URL from the displayed URL list by clicking on it. This will connect you to the product information related to the selected URL. You can return to the URL display list at anytime."

Notably, such an integrated Web server application can be realized in a variety of ways. The exact words and graphics used to create an interactive script for an integrated Web server application will vary from embodiment to embodiment of the present invention.

Modifications of the Illustrative Embodiments of the Invention

The present invention has been described in great detail with reference to the above illustrative embodiments. It is understood, however, that numerous modifications will readily occur to those with ordinary skill in the art having had the benefit of reading the present disclosure.

For example, in the illustrative embodiments described hereinabove, separate databases are maintained by each data-synchronized IPD Server for (i) registered products within the system, and (ii) non-registered products within the system. Notably, the reasons for using a dual database design of this sort would be based largely on economics, namely: only those companies who have paid the required maintenance (or registration) fees get their products and linked-URLs "registered" with the system, whereas nonpaying companies and organizations do not get their products and linked-URLs registered with the system, regardless of how such product-URL information is ascertained (e.g. by solicitation versus data-mining).

Thus it is contemplated that in some embodiments of the present invention, each IPD Server will be designed to maintain only a single database serving product-URL information currently available on the Internet. In such embodiments of the present invention, the concept of "non-registered" products will be altogether avoided, since the system implementation and administration will (in all likelihood) be designed to not require companies to pay maintenance (or registration) fees in order that their products and linked URLs are registered with the IPI system. Instead, some alternative income producing scheme will be used in such embodiments of the present invention (e.g. user fees, subscription fees, Internet browser-licensing fees, etc.) for system maintenance and administration.

When practicing the system and method of the present invention, it is preferred that the UPC label (with its human-readable UPC number) assigned to the particular product be attached, embossed or otherwise embodied on an accessible surface thereof. In addition to applying the UPC label to the external packaging of the product, it is preferred that the UPC label also be printed on any and all product instructions and manuals provided with the product. In this way, the UPC number can be easily read by a human being and then used to access a desired type of product information using the system and method of the present invention.

In order that the system hereof can be used to find information pertaining to large products such as automobiles, motorcycles, skidoos, farm machinery, boats, etc., the present invention also contemplates assigning UPC numbers to such products and attaching, embossing or otherwise embodying the same on an accessible surface thereof. Also, the UPC label can be printed on all instruction booklets and/or operating manuals normally provided with the product. In this way, information related to any particular product that is posted anywhere on the Internet and linked to URLs registered with the IPD Servers of the system hereof can be readily found using the uniquely assigned UPC number assigned thereto by the manufacturer at the time of sale. Notably multimedia information about such products can be most helpful in regard to the operation, repair and servicing of such products.

The system and method of the present invention has been shown to combine the use of UPC numbers, trademarks and company names when making a product information request of the system. It is understood, however, that the present invention can be practiced using anyone of these items of information, alone or in combination with each other, in order to place a product information request with the system hereof.

These and all other such modifications and variations are deemed to be within the scope and spirit of the present invention as defined by the accompanying Claims to Invention.

What is claimed is:

1. An Internet-supported kiosk for use by consumers within a retail shopping environment, said Internet-supported kiosk comprising:

an optical scanner for reading UPC symbols on consumer products being offered for sale in said retail shopping environment;

Internet access means for accessing a plurality of Internet-based information servers containing product-related information resources that are hyper-linked to UPC symbols on said consumer products; and a display screen for visually automatically displaying said product-related information accessed from said Internet-based information servers in response to the reading of said UPC symbols by said optical scanner.

2. A system for collecting and transmitting product related information on the Internet, said system comprising:

a database management subsystem including

URL/UPN information storage means for storing product-related information representative of (i) a plurality of universal product numbers (UPNs) assigned to a plurality of products, and (ii) a plurality of URLs symbolically linked to said plurality of UPNs, each said URL specifying the location of an information resource located on the Internet related to a particular one of said products; and a database server connected to the Internet and said database management subsystem and including product-related information receiving and storage means for receiving and storing said product-related information transmitted from said database management subsystem.

3. The system of claim 2, wherein said database server further comprises:

request servicing means for servicing a request made by a client system, for information about one of said plurality of products located on the Internet, wherein said request is transmitted to said Internet database server and includes information representative of the UPN assigned to said product.

4. The system of claim 2, which further comprises:

a plurality of product-information servers, each connected to the Internet and including product-related information storage means for storing information related to said plurality of products, and information delivery means, responsive to said request servicing means, for delivering to said client system, information related to one of said plurality of products specified by the URL symbolically linked to the UPN included in said request made by said client system.

5. The system of claim 2, wherein said UPN assigned to each said product is a unique Uniform Product Code (UPC) number assigned to said product.

6. An information collection system for collecting consumer product related information from manufacturers over the Internet and transmitting said consumer product related information to an Internet-based consumer product information finding and serving system, said information collection system comprising:

an information collecting server connected to the Internet and including (1) message transmitting means for transmitting a message over the Internet to a client system associated with a manufacturer, requesting that consumer product related information associated with each product of a manufacturer to be registered with said Internet-based consumer product information finding and serving system, be transmitted over the Internet to said information collecting server, said consumer product related information being representative of (i) a plurality of universal product numbers (UPNs) assigned to a plurality of consumer products, and (ii) a plurality of URLs symbolically linked to said plurality of UPNs, each said URL specifying the location of an information resource located on the Internet related to a particular one of said consumer products, and (2) information storage means for storing said consumer product related information; and (3) information transmission means for transmitting said consumer product related information to said Internet-based consumer product information finding and serving system for subsequent storage therein.

7. The information collection system of claim 6, which further comprises a computer system interconnected to said information collecting server, for administrating the registration of consumer products of manufacturers with said Internet-based consumer product information finding and serving system.

\* \* \* \* \*